US011272257B2

(12) United States Patent
Luo et al.

(10) Patent No.: US 11,272,257 B2
(45) Date of Patent: Mar. 8, 2022

(54) METHOD AND APPARATUS FOR PUSHING SUBTITLE DATA, SUBTITLE DISPLAY METHOD AND APPARATUS, DEVICE AND MEDIUM

(71) Applicant: TENCENT TECHNOLOGY (SHENZHEN) COMPANY LIMITED, Guangdong (CN)

(72) Inventors: Zi Heng Luo, Shenzhen (CN); Xiu Ming Zhu, Shenzhen (CN); Xiao Hua Hu, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 16/936,514

(22) Filed: Jul. 23, 2020

(65) Prior Publication Data

US 2020/0359104 A1  Nov. 12, 2020

Related U.S. Application Data

(63) Continuation of application No. PCT/CN2019/080299, filed on Mar. 29, 2019.

(30) Foreign Application Priority Data

Apr. 25, 2018 (CN) .......................... 201810379453.8

(51) Int. Cl.
*H04N 21/488* (2011.01)
*G10L 15/26* (2006.01)
(Continued)

(52) U.S. Cl.
CPC ....... *H04N 21/4884* (2013.01); *G10L 15/005* (2013.01); *G10L 15/26* (2013.01);
(Continued)

(58) Field of Classification Search
CPC .. H04N 21/23; H04N 21/233; H04N 21/2335; H04N 21/42203; H04N 21/4307;
(Continued)

(56) References Cited

U.S. PATENT DOCUMENTS

2006/0268841 A1* 11/2006 Nagaraj ............ H04L 29/06027
370/352
2007/0300249 A1* 12/2007 Smith .................. H04N 21/434
725/19
(Continued)

FOREIGN PATENT DOCUMENTS

CN   102802044 A   11/2012
CN   103561217 A   2/2014
(Continued)

OTHER PUBLICATIONS

International Search Report for PCT/CN2019/080299 dated Jun. 14, 2019 (PCT/ISA/210).
(Continued)

*Primary Examiner* — Nnenna N Ekpo
(74) *Attorney, Agent, or Firm* — Sughrue Mion, PLLC

(57) ABSTRACT

A method and apparatus for pushing subtitle data in a live scenario. The method includes: obtaining video stream data and audio stream data, the audio stream data being data corresponding to an audio part in the video stream data; generating the subtitle data according to the audio stream data, the subtitle data comprising a subtitle text corresponding to a speech in the audio stream data and time information of the subtitle text; and pushing, in response to pushing the video stream data to a user terminal, the subtitle data to the user terminal, the subtitle data instructing the user terminal to synchronously display the subtitle text with live pictures
(Continued)

in the video stream data and the audio part in the audio stream data according to the time information of the subtitle text.

15 Claims, 12 Drawing Sheets

(51) Int. Cl.
*G10L 15/00* (2013.01)
*H04N 21/2187* (2011.01)
*H04N 21/43* (2011.01)
*H04N 21/485* (2011.01)

(52) U.S. Cl.
CPC ..... *H04N 21/2187* (2013.01); *H04N 21/4307* (2013.01); *H04N 21/4856* (2013.01)

(58) Field of Classification Search
CPC ............... H04N 21/435; H04N 21/439; H04N 21/4394; H04N 21/4856; H04N 21/4884; G06K 9/00744; G10L 15/00; G10L 15/16; G10L 15/18; G10L 15/22; G10L 15/26
See application file for complete search history.

(56) References Cited

U.S. PATENT DOCUMENTS

| | | | | |
|---|---|---|---|---|
| 2008/0243506 A1* | 10/2008 | Sakai | ................. | G10L 15/32 704/256.4 |
| 2008/0284910 A1* | 11/2008 | Erskine | .......... | H04N 21/234336 348/468 |
| 2016/0066055 A1* | 3/2016 | Nir | ................. | H04N 21/439 725/35 |
| 2017/0325003 A1 | 11/2017 | Hackett et al. | | |
| 2017/0353770 A1* | 12/2017 | Jiang | ................. | H04N 21/8456 |

FOREIGN PATENT DOCUMENTS

| | | |
|---|---|---|
| CN | 104581221 A | 4/2015 |
| CN | 105744346 A | 7/2016 |
| CN | 108600773 A | 9/2018 |

OTHER PUBLICATIONS

Written Opinion of the International Searching Authority dated Jun. 14, 2019, in Application No. PCT/CN2019/080299.

* cited by examiner

METHOD AND APPARATUS FOR PUSHING SUBTITLE DATA, SUBTITLE DISPLAY METHOD AND APPARATUS, DEVICE AND MEDIUM

CROSS-REFERENCE TO RELATED APPLICATION(S)

This application is a continuation of PCT/CN2019/080299, and is based on and claims priority to Chinese Patent Application No. 201810379453.8, entitled "METHOD AND APPARATUS FOR PUSHING SUBTITLE DATA, SUBTITLE DISPLAY METHOD AND APPARATUS, DEVICE AND MEDIUM," filed with China National Intellectual Property Administration on Apr. 25, 2018, which are incorporated by reference herein in their entireties.

BACKGROUND

1. Field

The disclosure relates to the field of Internet application technologies, and in particular, to a method for pushing subtitle data, a subtitle display method, an apparatus, a device, and a medium.

2. Description of Related Art

With the continuous development of mobile Internet, video live broadcast applications are becoming increasingly extensive, and inserting subtitles in live videos has also become an important means to improve user viewing experience.

In the related art, subtitles in live videos are usually manually inserted at a live recording end, such as a recording scene/studio. For example, in a process of capturing and encoding video images on the live recording end, subtitle data is manually inserted by field staff, the live recording end uploads a live video stream to a server through a live access service, and the server transcodes the live video stream through a live transcoding service and transmits the transcoded live video stream to a player on a user terminal through a content distribution network for playback.

SUMMARY

Embodiments of this disclosure provide a method for pushing subtitle data, a subtitle display method, an apparatus, a device, and a medium.

According to an embodiment, there is provided a method for pushing subtitle data, performed by a computer device, the method including: obtaining video stream data and audio stream data, the audio stream data being data corresponding to an audio part in the video stream data; generating the subtitle data according to the audio stream data, the subtitle data comprising a subtitle text corresponding to a speech in the audio stream data and time information of the subtitle text; and pushing, in response to pushing the video stream data to a user terminal, the subtitle data to the user terminal, the subtitle data instructing the user terminal to synchronously display the subtitle text with live pictures in the video stream data and the audio part in the audio stream data according to the time information of the subtitle text.

According to an embodiment, there is provided an apparatus for pushing subtitle data, including: at least one memory storing compute program code and at least one processor configured to access the at least one memory and operate as instructed by the computer program code. The computer program code including: stream obtaining code configured to cause the at least one processor to obtain video stream data and audio stream data, the audio stream data being data corresponding to an audio part in the video stream data; subtitle data generation code configured to cause the at least one processor to generate the subtitle data according to the audio stream data, the subtitle data comprising a subtitle text corresponding to a speech in the audio stream data and time information of the subtitle text; and subtitle pushing code configured to cause the at least one processor to push, in response to pushing the video stream data to a user terminal, the subtitle data to the user terminal, the subtitle data instructing the user terminal to synchronously display the subtitle text with live pictures in the video stream data and the audio part in the audio stream data according to the time information of the subtitle text.

According to an embodiment, there is provided a non-transitory computer-readable storage medium, storing at least one instruction, the at least one instruction, when loaded and executed by a processor, the processor is configured to: obtain video stream data and audio stream data, the audio stream data being data corresponding to an audio part in the video stream data; generate the subtitle data according to the audio stream data, the subtitle data comprising a subtitle text corresponding to a speech in the audio stream data and time information of the subtitle text; and push, in response to pushing the video stream data to a user terminal, the subtitle data to the user terminal, the subtitle data instructing the user terminal to synchronously display the subtitle text with live pictures in the video stream data and the audio part in the audio stream data according to the time information of the subtitle text.

According to embodiments of this disclosure, for video stream data, subtitle data including subtitle text and time information may be generated according to audio stream data corresponding to an audio part in the video stream data, then the subtitle data is pushed to a user terminal, and the user terminal synchronously displays the subtitle text and live pictures in the video stream data according to the time information, thereby implementing accurate synchronization of subtitles and video pictures. Therefore, there is no need to manually insert the subtitle data, and live delay can be effectively reduced.

BRIEF DESCRIPTION OF THE DRAWINGS

The following description briefly introduces the accompanying drawings, which illustrate embodiments of the disclosure.

DESCRIPTION

Example embodiments are described in detail herein with reference to the accompanying drawings. Unless otherwise indicated, the description uses same numbers in different accompanying drawings to represent same or similar elements. The following implementations described in the following embodiments do not represent all implementations. The embodiments described herein are merely examples of apparatuses and methods to enable a person of ordinary skill in the art to reasonably understand the disclosure.

Here, some concepts are first introduced before describing the embodiments of the disclosure in more detail.

(1) Subtitle

Subtitle may be a non-video content such as dialogs or narrations displayed in the form of text in online videos, televisions, movies, and stage works, and also generally refers to post-processing text of film and television works.

(2) Live Broadcast

Live broadcast may be a set of technologies that rich elements such as images, sounds, and text are used to display vivid and intuitive real pictures to users through the Internet by using the streaming media technology, and may relate to a series of service modules such as an encoding tool, streaming media data, a server, a network, and a player.

(3) Real-Time Translation

Real-time translation may be instantaneous translation of speech or text in one language into speech or text in another language by a human or a computer. In the embodiments, the real-time translation may include speech recognition and instant translation based on artificial intelligence.

(4) Hyper Text Transfer Protocol Live Streaming

Hyper text transfer protocol live streaming (HLS) may be an HTTP-based streaming media network transmission protocol, and may implement streaming media on demand and live broadcast.

(5) M3U8 File

The M3U8 file may be a Moving Picture Experts Group Audio Layer 3 Uniform Resource Locator (M3U) file that is encoded based on an 8-bit unicode transformation format (UTF-8). The M3U8 file may be a resource index file, and is usually used to store an address list of playable multimedia files.

(6) Transport Stream File

The transport stream (TS) file may be a file format for streaming media transmission. In the TS file, a main format of video encoding is h264 or mpeg4, and a main format of audio encoding is acc/MP3.

Figure 1:
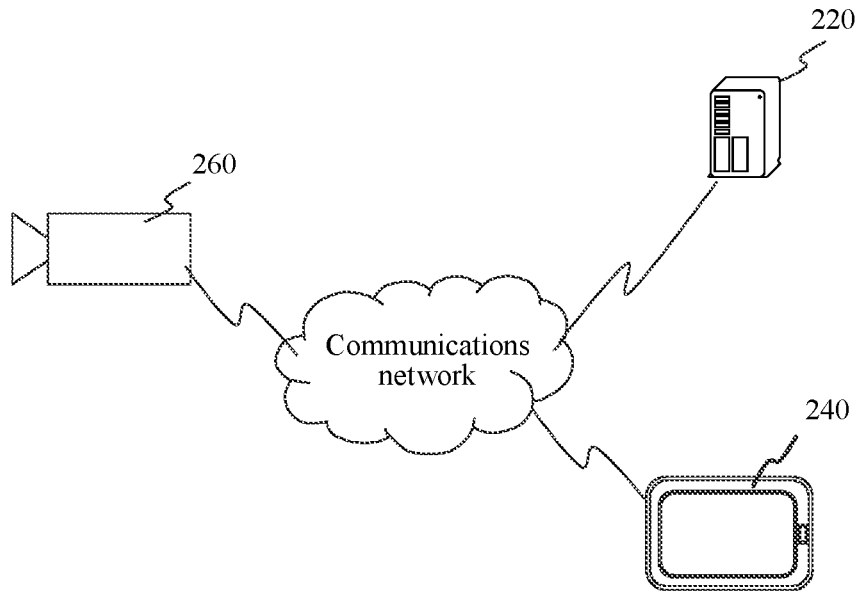
FIG. 1 is a schematic structural diagram of a video stream pushing system according to an embodiment.

FIG. 1 is a schematic structural diagram of a video stream pushing system according to an embodiment. The system includes a server 220 and user terminals 240.

The server 220 may include one server, several servers, a virtualization platform, or a cloud computation service center.

The user terminal 240 may be a terminal device having a video playback function. For example, the user terminal may be a mobile phone, a tablet computer, an e-book reader, smart glasses, a smartwatch, a Moving Picture Experts Group Audio Layer III (MP3) player, a Moving Picture Experts Group Audio Layer IV (MP4) player, a laptop portable computer, a desktop computer, or the like.

The user terminal 240 may be connected to the server 220 through a communications network. The communications network may be a wired network or a wireless network.

In the embodiments, the server 220 may transmit video stream data to the user terminal 240, and the user terminal 240 may perform video playback according to the video stream data.

The video stream pushing system may further include a live recording terminal 260.

The live recording terminal 260 may be a smartphone, a tablet computer, an e-book reader, smart glasses, a smartwatch, an MP3/MP4 player, a laptop portable computer, a desktop computer, or the like.

The live recording terminal 260 includes an image capturing component and an audio capturing component. The image capturing component and the audio capturing component may be parts of the live recording terminal 260. For example, the image capturing component and the audio capturing component may be a built-in camera and a built-in microphone in the live recording terminal 260. Alternatively, the image capturing component and the audio capturing component may be connected to the live recording terminal 260 as peripheral devices of the live recording terminal 260. For example, the image capturing component and the audio capturing component may be a camera and a microphone connected to the live recording terminal 260 separately. Alternatively, the image capturing component and the audio capturing component may be partially built into the live recording terminal 260, and partially used as peripheral devices of the live recording terminal 260. For example, the image capturing component may be a camera built into the live recording terminal 260, and the audio capturing component may be a microphone in a headset connected to the live recording terminal 260. However, implementations of the image capturing component and the audio capturing component are not limited to the embodiments.

In the embodiments, the live recording terminal 260 may upload a live video stream recorded locally to the server 220, and the server 220 performs transcoding and other related processing on the live video stream and pushes it to the user terminal 240.

In a possible implementation, a live application (APP) client (such as a Tencent video client or a trick live client) may be installed in the live recording terminal 260, and the server 220 may be a live server corresponding to the foregoing live application.

During live broadcast, the live recording terminal 260 may run the live application client. After a user (also referred to as an anchor) triggers to start a live function in a live application interface, the live application client may control the image capturing component and the audio capturing component in the live recording terminal to record a live video stream, and upload the recorded live video stream to a live server. The live server receives the live video stream, and establishes a live channel for the live video stream. A process of establishing a live channel includes, for example, assigning a live channel name to the live video stream, where different live video streams having different live channel names, associating the live channel name with a user ID of a user who uploads the live video stream (for example, a user name of the user on the live application), and allocating storage space occupied by the live channel and generating a link address of the live channel on the server. A user of the user terminal may access the live server through the live application client or a browser client installed in the user terminal. After the user selects the live channel on an access page, the live server pushes the live video stream to the user terminal, and the user terminal plays the live video stream in the live application interface or a browser interface.

The system may further include a management device. The management device may be connected to the server 220 through a communications network. The communications network may be a wired network or a wireless network.

According to the embodiments, a standard communications technology and/or protocol may be used for the wireless network or the wired network described above. The network is usually the Internet, but may be any other network, including, but not limited to, a local area network (LAN), a metropolitan area network (MAN), a wide area network (WAN), a mobile, wired, or wireless network, or any combination of a dedicated network or a virtual dedicated network. In some embodiments, technologies and/or formats such as hypertext markup language (HTML) and extensible markup language (XML) are used to represent data exchanged through a network. In addition, encryption technologies such as Secure Socket Layer (SSL), Transport Layer Security (TLS), Virtual Private Network (VPN), and Internet Protocol Security (IPsec) may be used to encrypt all or some links. In some other embodiments, custom and/or dedicated data communications technologies may also be used in place of or in addition to the foregoing data communication technologies.

Figure 2:
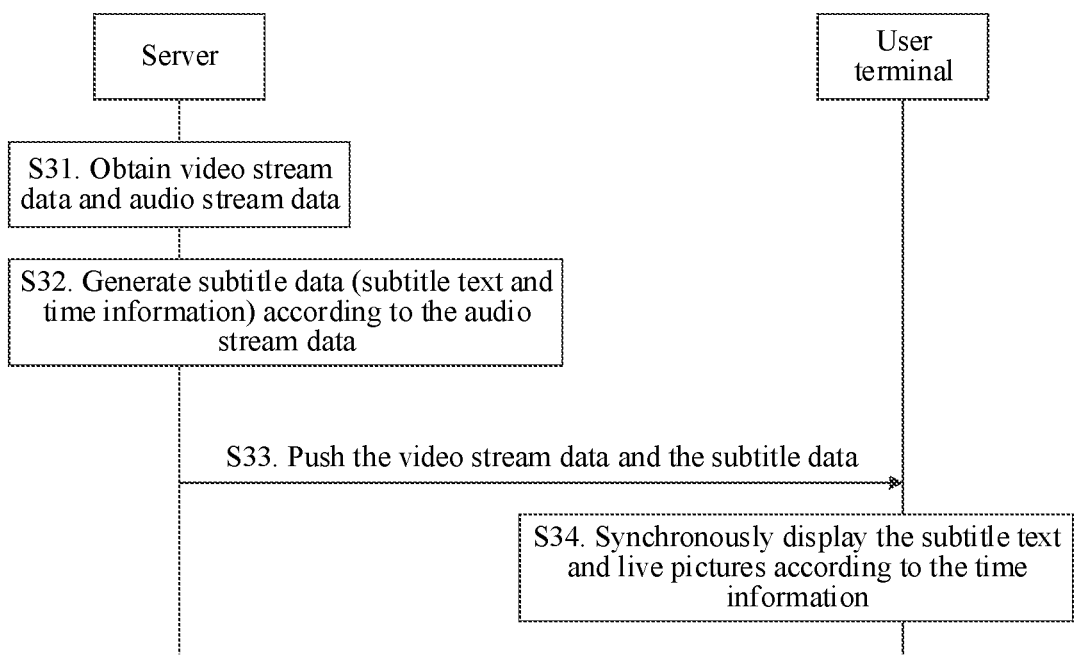
FIG. 2 is a flowchart of a method for pushing subtitle data and displaying subtitles according to an embodiment.

FIG. 2 is a flowchart of a method for pushing subtitle data and displaying subtitles according to an embodiment. The method for pushing subtitle data and displaying subtitles may be used in the video stream pushing system shown in FIG. 1. As shown in FIG. 2, the method for pushing subtitle data and displaying subtitles may include the following steps:

In Step S31, a server obtains video stream data and audio stream data, the audio stream data being data corresponding to an audio part in the video stream data.

In Step S32, the server generates the subtitle data according to the audio stream data, the subtitle data including subtitle text corresponding to speech in the audio stream data, and time information corresponding to the subtitle text.

In this embodiment, the time information may be information used for indicating playback time of the subtitle data, the audio stream data, or live video stream data.

In Step S33, the server pushes, in response to pushing the video stream data to a user terminal, the subtitle data to the user terminal, and correspondingly, the user terminal receives the subtitle data when receiving the video stream data.

In Step S34, the user terminal synchronously displays the subtitle text and pictures in the video stream data according to the time information corresponding to the subtitle text.

As shown in steps S31 and S32, the steps of obtaining audio stream data and generating subtitle data inevitably require a particular amount of processing time. Therefore, in this embodiment, to enable the user terminal to synchronously display the video stream data and the subtitle text, the server may push the video stream data to the user terminal after delaying a preset duration from a first moment, the first moment being a moment when the video stream data is obtained.

In this embodiment, a fixed delay duration (that is, the foregoing preset duration, for example, 5 minutes) may be preset. Timing starts when the video stream data is obtained. On one hand, the video stream data is cached, and on the other hand, the foregoing steps S31 and S32 start to be performed. When the timing reaches the foregoing delay duration, the video stream data is allowed to be pushed to the user terminal.

The preset duration may be preset in code by a developer, or may be set or changed by a system administrator or a user. The preset duration may be longer than a duration required to perform the foregoing steps S31 and S32.

When pushing the subtitle data to the user terminal, the server may receive a subtitle obtaining request transmitted by the user terminal, the subtitle obtaining request carrying language indication information, and the language indication information being used for indicating a subtitle language. The server may push the subtitle data to the user terminal, in a case that the subtitle language indicated by the language indication information is a language corresponding to the subtitle text.

In this embodiment, when generating the subtitle data, the server may generate corresponding subtitle data for each language. A user terminal side may provide a language selection interface, and the user may choose from the language selection interface to obtain subtitle data corresponding to a selected language. The user terminal transmits a subtitle obtaining request carrying language indication information to the server according to the selection operation of the user, and the server transmits subtitle data corresponding to the language indicated by the language indication information in response to the request from the user terminal.

When generating subtitle data according to the audio stream data, the server may generate the subtitle data according to the audio stream data through a target service, the target service being any one of at least one subtitle generation service, the subtitle obtaining request further carrying a service identifier, and the service identifier being generated on the user terminal according to the selection operation of the user on the language selection interface and being used for indicating a subtitle generation service. The server pushes the subtitle data to the user terminal based on the subtitle language indicated by the language indication information being the language corresponding to the subtitle text and the subtitle generation service indicated by the service identifier being the target service.

The at least one subtitle generation service may be a single subtitle generation service, or the at least one subtitle generation service may include two or more subtitle generation services. That is, the server may use a plurality of subtitle generation services to simultaneously generate subtitle data corresponding to different languages, and subtitle data generated by each subtitle generation service is independent. The user may select, on the user terminal side, subtitle data corresponding to a language generated by a subtitle generation service. The user terminal instructs the server to transmit subtitle data corresponding to the subtitle generation service and the language through the subtitle obtaining request.

According to an embodiment, for video stream data, subtitle data including subtitle text and time information may be generated according to audio stream data corresponding to an audio part in the video stream data, then the subtitle data is pushed to a user terminal, and the user terminal synchronously displays the subtitle text and pictures in the video stream data according to the time information, thereby implementing accurate synchronization of subtitles and video pictures. Accordingly, since there is no need to manually insert the subtitle data, live broadcast delay can be effectively reduced.

The foregoing embodiment may be applied in a live scenario, or may be used in an on-demand scenario. Here, the embodiments will be described by using a live scenario as an example.

Figure 3:
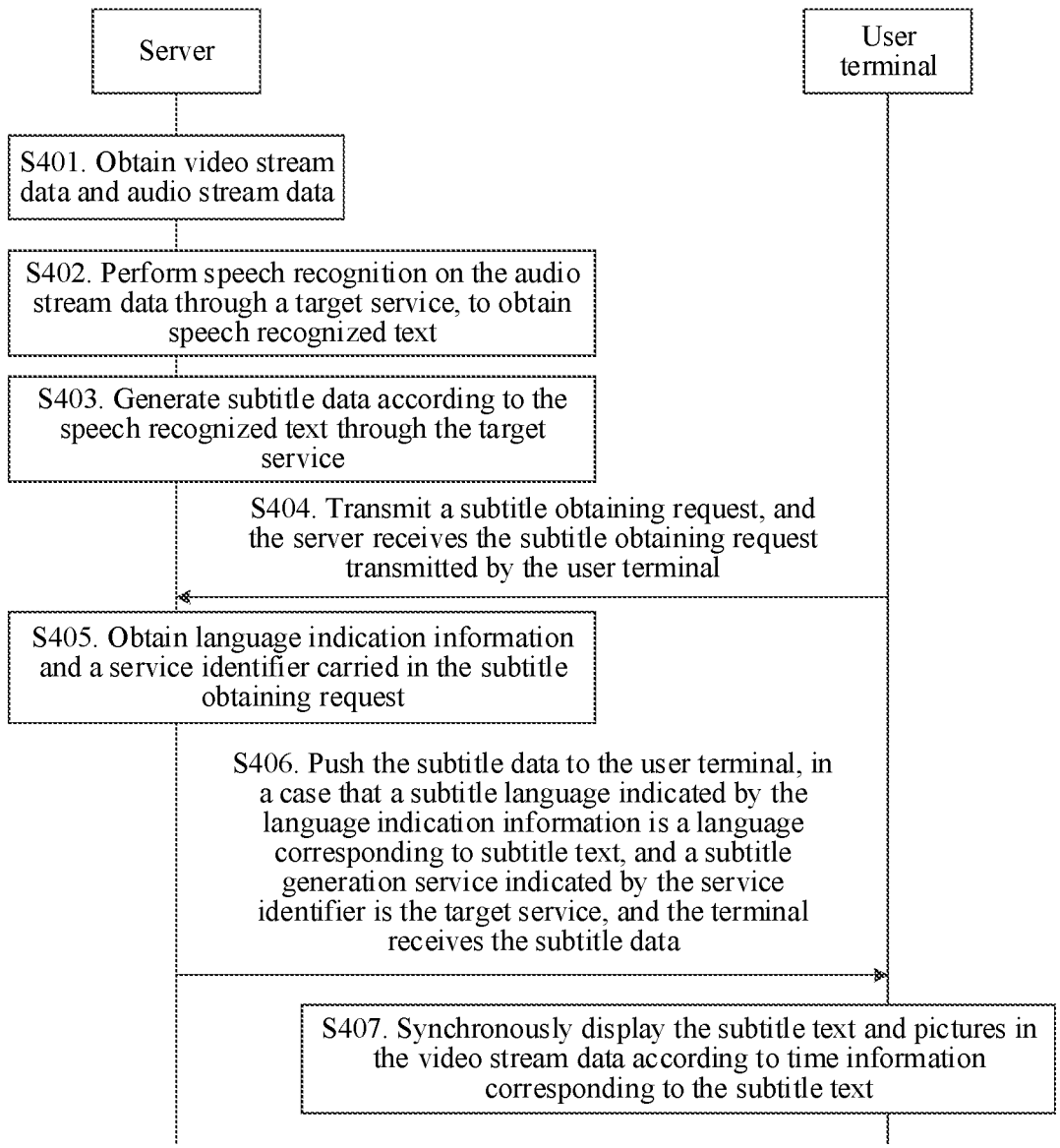
FIG. 3 is a flowchart of a method for pushing subtitle data and displaying subtitles according to an embodiment.

FIG. 3 is a flowchart of a method for pushing subtitle data and displaying subtitles according to an embodiment. The method for pushing subtitle data and displaying subtitles may be used in the video stream pushing system shown in FIG. 1. As shown in FIG. 3, the method for pushing subtitle data and displaying subtitles may include the following steps:

In Step S401, the server may obtain video stream data and audio stream data, the audio stream data being data corresponding to an audio part in the video stream data.

For example, the live recording terminal records a live video on a live scene, encodes the recorded video into a video stream (that is, a live video stream), and transmits the video stream to the server. After receiving the video stream transmitted from the live recording terminal, the server first transcodes the received video stream to obtain the video stream data. In the live scenario, the video stream data is live video stream data.

For example, after obtaining the video stream, the server performs audio and video demultiplexing to obtain an audio stream and a picture frame stream. The server synchronously slices the audio stream and the picture frame stream to synchronously obtain audio stream data and corresponding picture frame stream data. After synchronous slicing, the audio stream is divided into two paths. On the one hand, the server performs audio and video multiplexing on one path of audio stream obtained after slicing and the picture frame stream, and performs stream grouping to obtain the video stream data. On the other hand, the server performs audio multiplexing on the other path of audio stream obtained after slicing, and performs audio stream grouping to obtain the audio stream data.

In this embodiment, the video stream data obtained after grouping may include a series of video stream data blocks, and the audio stream data obtained after grouping may include a series of audio stream data blocks.

The video stream data blocks in the video stream data obtained after grouping are in one-to-one correspondence, in time, to the audio stream data blocks in the audio stream data obtained after grouping. In other words, playback time of one video stream data block is exactly the same as playback time of one audio stream data block. For example, each of the video stream data block and the audio stream data block includes respective time information, and a correspondence between the video stream data block and the audio stream data block is indicated by respective time information, that is, the video stream data block and the audio stream data block in one-to-one correspondence include the same time information.

Figure 4:
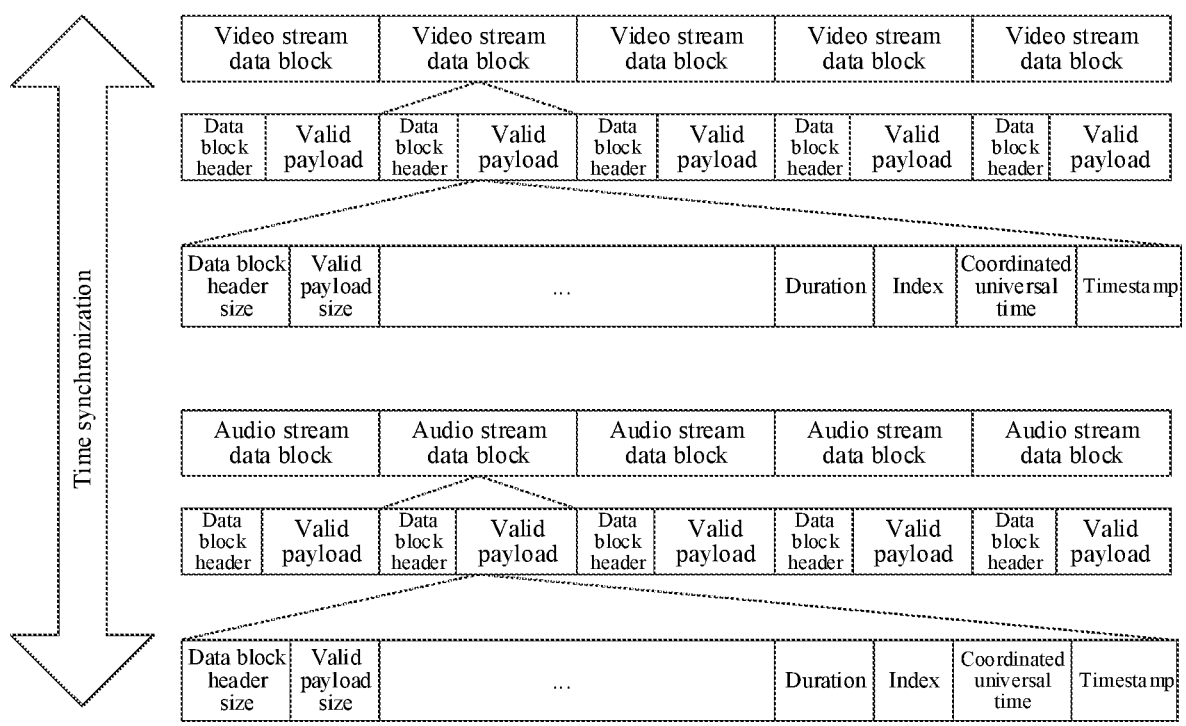
FIG. 4 is a data structure diagram of video stream data in the embodiment of FIG. 3.

For example, FIG. 4 is a data structure diagram of video stream data according to an embodiment.

As shown in FIG. 4, a video stream data block in the video stream data includes a data block header and a valid payload. The valid payload includes picture frames in the video stream data block and audio data in the audio stream data block. The data block header includes information such as a data block header size (header size), a valid payload size (payload_size), duration, an index, coordinated universal time (UTC), and timestamp. The data block header size is used for indicating the amount of data occupied by the data block header in the current video stream data block. The valid payload size is used for indicating the amount of data occupied by the valid payload in the current video stream data block. The duration is used for indicating a playback duration of the picture frames and the audio data in the current video stream data block, that is, a playback duration of the current video stream data block. The index is used for indicating an order of the current video stream data block in the video stream and/or for identifying the current video stream data block. The coordinated universal time is used for indicating system time at which the current video stream data block is transcoded (for example, may be system time at which the first picture frame in the video stream data block is transcoded). The timestamp is used for indicating a time position of the current video stream data block in the live video stream.

Similarly, in FIG. 4, an audio stream data block in the audio stream data also includes a data block header and a valid payload. The valid payload may include audio frames (or referred to as audio data) in the audio stream data block. The data block header includes information such as a data block header size, a valid payload size, duration, an index, coordinated universal time, and timestamp. The data block header size is used for indicating the amount of data occupied by the data block header in the current audio stream data block. The valid payload size is used for indicating the amount of data occupied by the valid payload in the current audio stream data block. The duration is used for indicating a playback duration of the audio data in the current audio stream data block, that is, a playback duration of the current audio stream data block. The index is used for indicating an order of the current audio stream data block in a first audio stream and/or for identifying the current audio stream data block. The coordinated universal time is used for indicating system time at which the current audio stream data block is transcoded (for example, may be system time at which the first audio frame in the audio stream data block is transcoded). The timestamp is used for indicating a time position of the current audio stream data block in the audio stream.

In the video stream data and the audio stream data shown in FIG. 4, respective time information of the video stream data block and the audio stream data block may be represented by the coordinated universal time and/or the timestamp in respective data block headers, that is, the data block headers of a set of the video stream data block and the audio stream data block that are synchronized in time have the same coordinated universal time and timestamp.

The server may transcode the video stream through the same transcoding process in the same transcoding device to obtain the video stream data and the audio stream data with synchronized time information.

Figure 5:
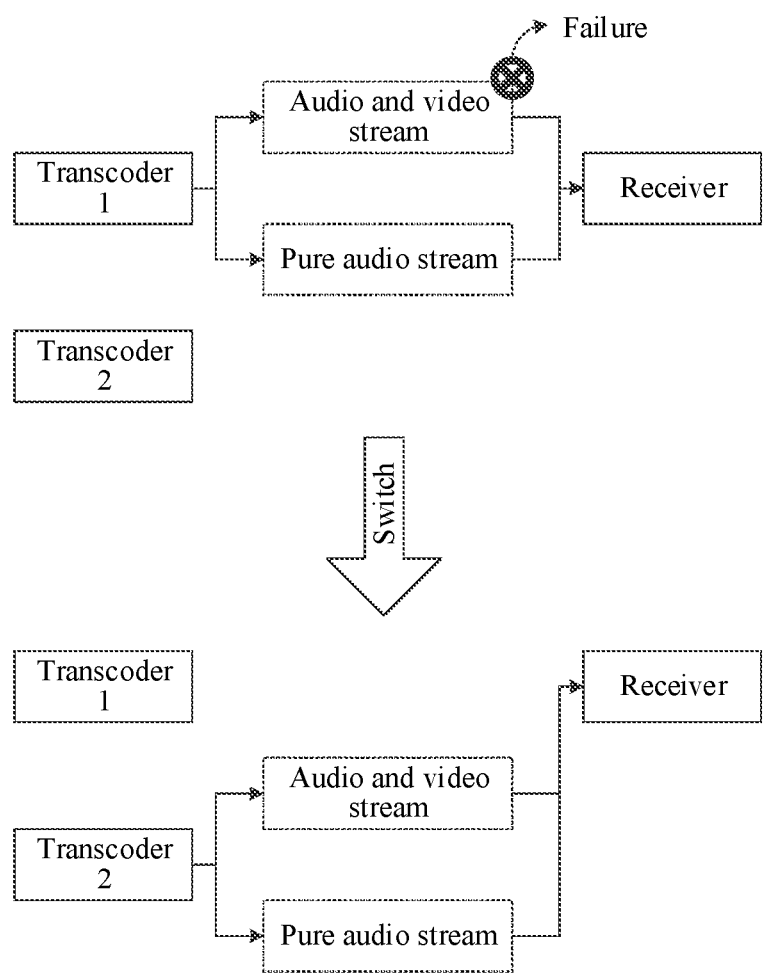
FIG. 5 is a schematic diagram of transcoding switch in the embodiment of FIG. 3.

In this embodiment, to ensure the consistency of the timestamps of the live video stream data and translated data stream (that is, the subtitle data), it is necessary to ensure that a pure audio stream (that is, the audio stream data) and an audio, and video stream (that is, the video stream data) that are outputted from a transcoding and transpackaging service are on the same machine and in the same process. For example, FIG. 5 is a schematic diagram of transcoding switch according to an embodiment. As shown in FIG. 5, both the audio and video stream (for example, an audio and video stream named 1014837001.ts) and the pure audio stream (for example, a pure audio stream named 1014837004.ts) are outputted from a transcoder 1 as a master to a receiver, so that it can be ensured that display timestamps (pts) are aligned, where the transcoder may be an HLS converter (hlsconverter), and the receiver may be an HLS receiver (hlsreceiver). To ensure stable video viewing experience, when the path of the audio and video stream in the master encounters a failure, it is necessary to switch the audio and video stream to a slave. In this case, to ensure the synchronization of the timestamps in the video and subtitles, it is necessary to switch the pure audio stream of the subtitles to the slave at the same time. That is, after switching, both the audio and video stream 1014837001.ts and the pure audio stream 1014837004.ts are outputted from a transcoder 2 as a slave to the receiver.

In Step S402, the server performs speech recognition on the audio stream data through a target service to obtain speech recognized text, the target service being any one of at least one subtitle generation service.

In this embodiment, a plurality of subtitle generation services may be connected to the server, each subtitle generation service is provided by a different service party, and each subtitle generation service independently implements speech recognition on the audio stream data. The server may separately provide the foregoing audio stream data to the subtitle generation services.

When performing speech recognition on the audio stream data through a target service, the server may perform speech start and end detection on the audio stream data through the target service to obtain a speech start frame and a speech end frame in the audio stream data, the speech start frame being an audio frame at the start of a speech segment, and the speech end frame being an audio frame at the end of the speech segment. Further, the server may perform speech recognition on target speech data in the audio stream data through the target service to obtain recognized text corresponding to the target speech data, the target speech data including audio frames between any set of the speech start frame and the speech end frame in the audio stream data. The foregoing speech segment may be, for example, a complete sentence.

In this embodiment, the target service may implement speech start and end detection through a generic detection. For example, FIG. 5 is a flowchart of speech recognition according to an embodiment. As shown in FIG. 5, after recognizing a speech start frame in the audio stream data, the target service starts to perform generic detections on audio frames after the speech start frame to determine whether a currently detected audio frame corresponds to an audio end point (or the foregoing speech end frame), and inputs the detected audio frames into a speech recognition model for speech recognition. When detecting the audio end point, the target service stops speech recognition and outputs recognized text. After sentence splitting, the target service enters a subsequent subtitle data generation process.

In an embodiment, the target service may perform recognition on complete target speech data to obtain complete recognized text corresponding to the target speech data. In this implementation, time information of the complete recognized text corresponding to the target speech data is consistent with time information of the target speech data.

Alternatively, in another embodiment, the target service may perform recognition on the target speech data for many times in chronological order, and recognition is performed on audio frames from a starting point of the target speech data to a recognition time point each time to obtain a plurality of pieces of recognized text. In the plurality of pieces of recognized text, the last recognized text is complete recognized text corresponding to the target speech data, and other recognized text is incomplete recognized text obtained by performing recognition on some of the target speech data.

For example, the server may perform speech frame extraction at predetermined time intervals according to time information corresponding to the audio frames in the target speech data through the target service to obtain at least one piece of speech subdata. A speech subdata may include audio frames between the speech start frame and a target audio frame in the target speech data, where the target audio frame is an audio frame in which the speech frame extraction operation of the speech subdata corresponds to the time information in the target speech data. Subsequently, the server may perform speech recognition on the at least one piece of speech subdata through the target service to obtain recognized subtext corresponding to the at least one piece of speech subdata, respectively, as recognized text corresponding to the target speech data through the target service.

In the implementation in which the target service performs recognition on the target speech data for many times in chronological order. Here, time information of the recognized subtext corresponding to the speech subdata may not be consistent with time information of the speech subdata. Specifically, when one piece of speech subdata is the first piece of extracted speech subdata in the target speech data, time information of recognized subtext corresponding to the speech subdata is consistent with time information of the speech subdata. However, when the speech subdata is other speech subdata, rather than the first piece of extracted speech subdata in the target speech data, time information of recognized subtext corresponding to the speech subdata may not be consistent with the time information of the speech subdata. Instead, time information of the recognized subtext corresponding to the speech subdata may be consistent with time information of a previous piece of extracted speech subdata. For example, a time period indicated by the time information of the target speech data is 16:30:10 to 16:30:15. Assuming that the target service performs recognition on the target speech data for three times, and time periods corresponding to speech subdata obtained through the recognition for three times are respectively 16:30:10 to 16:30:12, 16:30:10 to 16:30:14, and 16:30:10 to 16:30:15, a first time period corresponding to time information of recognized subtext obtained through the first recognition (that is, recognized subtext corresponding to the first piece of extracted speech subdata) is 16:30:10 to 16:30:12, a second time period corresponding to time information of recognized subtext obtained through the second recognition (that is, recognized subtext corresponding to the second piece of extracted speech subdata) is 16:30:12 to 16:30:14, and a third time period corresponding to time information of recognized subtext obtained through the third recognition (that is, recognized subtext corresponding to the third piece of extracted speech subdata) is 16:30:14 to 16:30:15.

Figure 6:
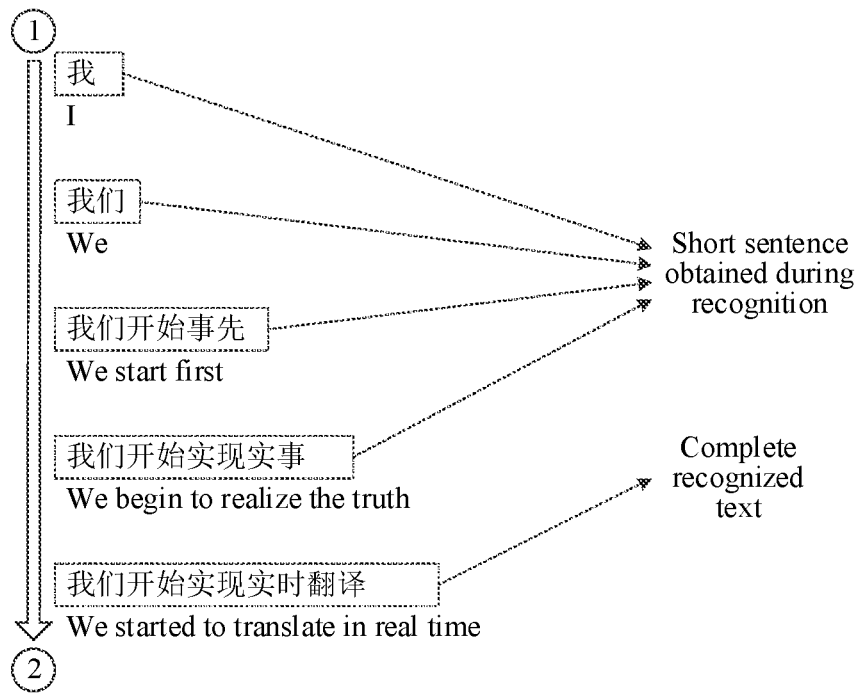
FIG. 6 is a schematic flowchart of recognition and translation in the embodiment of FIG. 3.

Due to the need to ensure the accuracy of sentence recognition and translation, the target service needs to read audio for a period of time and process it, and obtain a final complete sentence with reference to contextual context and calculation by a deep neural network. Therefore, it is necessary to perform delay processing on live streaming, and this affects the real-time performance of live broadcast to some extent. For example, FIG. 6 is a schematic flowchart of recognition and translation according to an embodiment. As shown in FIG. 6, if the target service directly performs recognition on complete target speech data to obtain a complete recognized text corresponding to the target speech data, only the complete recognized text will be displayed subsequently. If recognition is performed on the target speech data for many times in chronological order, a short sentence obtained during recognition may be used to repair a previous sentence, thus improving the quality of subtitles in video watching, improving user experience of watching a video stream based on machine translation, enhancing the interactivity, and implementing the interactive display form of subtitles by the player.

In Step S403, the server generates the subtitle data according to the speech recognized text through the target service.

In this embodiment, the server may translate the speech recognized text into a translated text corresponding to a target language through the target service; generate the subtitle text according to the translated text through the target service, the subtitle text including the translated text, or the subtitle text including the speech recognized text and the translated text; and generate the subtitle data according to the subtitle text through the target service.

In this embodiment, the target service may generate subtitle data corresponding to each language. For example, it is assumed that a language corresponding to the speech recognized text obtained by the speech recognition is Chinese, and target languages include English, Russian, Korean, and Japanese, and for example, the subtitle text includes the speech recognized text and the translated text. The server may generate four types of subtitle data, that is, subtitle data corresponding to "Chinese+English", subtitle data corresponding to "Chinese+Russian", subtitle data corresponding to "Chinese+Korean", and subtitle data corresponding to "Chinese+Japanese".

Figure 7:
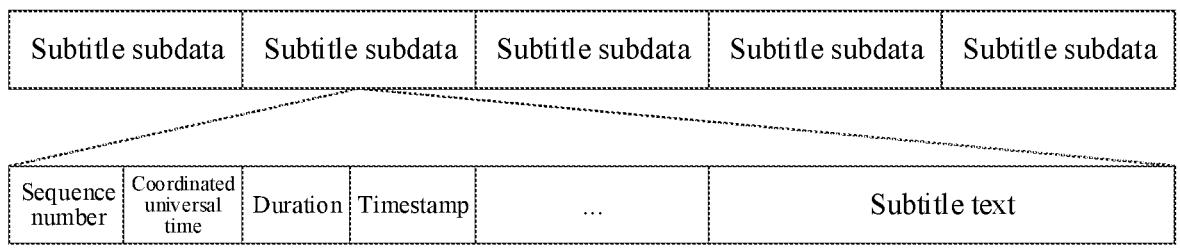
FIG. 7 is a schematic structural diagram of subtitle data in the embodiment of FIG. 3.

In this embodiment, the subtitle data further includes time information corresponding to the subtitle text. For example, the subtitle data may include several pieces of subtitle subdata, and each piece of subtitle subdata may correspond to a complete speech or the first half of a complete speech. FIG. 7 is a schematic structural diagram of subtitle data according to an embodiment. As shown in FIG. 7, each piece of subtitle subdata includes information such as a sequence number (seq), coordinated universal time, duration, a timestamp, and subtitle text. The duration in the subtitle subdata may be a duration of the corresponding subtitle text, the coordinated universal time in the subtitle subdata may be a starting time point of the corresponding subtitle text (that is, coordinated universal time when the first audio frame corresponding to the subtitle text is transcoded), and the timestamp in the subtitle subdata may be a timestamp of the first audio frame corresponding to the subtitle text. The coordinated universal time and/or timestamp in the subtitle subdata are/is time information of the subtitle text included in the subtitle subdata.

In this embodiment, the server detects whether sequence numbers of data blocks in the subtitle data are consecutive and requests, in a case that the sequence numbers of the data blocks in the subtitle data are not consecutive, data blocks corresponding to missing sequence numbers from the target service. The missing sequence numbers may be any sequence number that is missing between a sequence number of the first data block and a sequence number of the last data block in the subtitle data. Based on receiving the missing data block corresponding to the missing sequence number, the server completes the subtitle data through rearranging the data blocks including the missing sequence numbers.

In this embodiment, when generating subtitle data, the subtitle generation services may serially number data blocks in the subtitle data. After obtaining the subtitle data generated by the target service, and in response to finding that sequence numbers of subtitle data blocks in the subtitle data are not consecutive, the server may request subtitle data blocks corresponding to missing sequence numbers to the target service, to prevent the semantic discontinuity caused by missing subtitles.

In Step S404, the terminal transmits a subtitle obtaining request to the server, and the server receives the subtitle obtaining request transmitted by the user terminal.

The subtitle obtaining request may include language indication information and a service identifier, the language indication information being used for indicating a subtitle language, and the service identifier being used for indicating a subtitle generation service.

In an embodiment, the user terminal may display a subtitle selection interface, in which the subtitle selection interface includes at least one subtitle option, and each subtitle option corresponding to a combination of a subtitle language and a subtitle generation service. The user terminal generates, in a case that a selection operation in the subtitle selection interface is received from a user, the subtitle obtaining request according to a subtitle option corresponding to the selection operation.

Figure 8:
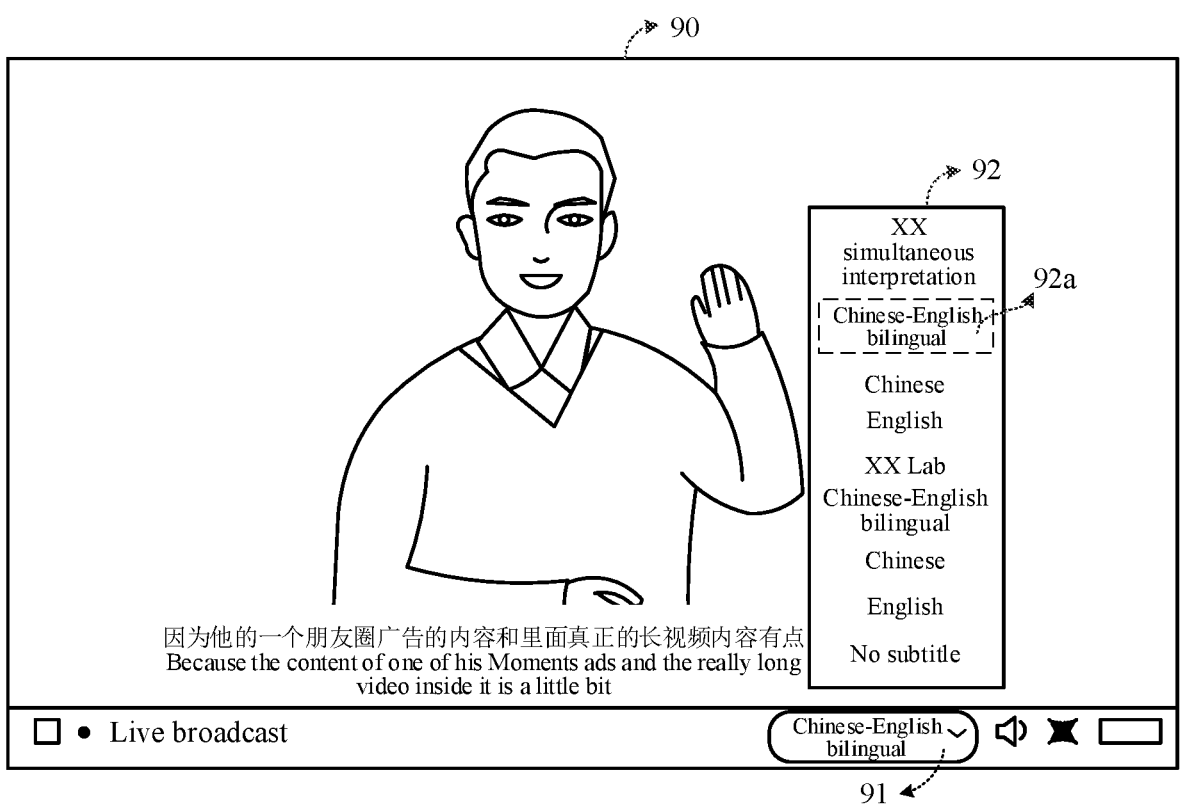
FIG. 8 is a schematic diagram of a playback interface in the embodiment of FIG. 3.

FIG. 8 is a schematic diagram of a playback interface according to an embodiment. As shown in FIG. 8, a bottom of a video playback interface 90 includes a subtitle selection menu 91. When the user taps the subtitle selection menu 91, a subtitle selection interface 92 is displayed above the subtitle selection menu 91 on the video playback interface 90. The subtitle selection interface 92 includes various subtitle generation services (for example, "XX simultaneous interpretation" and "XX Lab" in FIG. 8), and subtitle options of different languages respectively corresponding to the subtitle generation services. After the user performs a selection operation on an option 92a (corresponding to an option of "Chinese-English bilingual" under "XX simultaneous interpretation" in FIG. 8) in the subtitle selection interface 92, the language indication information in the subtitle obtaining request generated by the user terminal indicates that languages corresponding to the subtitle text are Chinese and English, and the subtitle generation service indicated by the service identifier in the subtitle obtaining request generated by the user terminal is "XX simultaneous interpretation".

In Step S405, the server obtains the language indication information and the service identifier included in the subtitle obtaining request.

For example, the terminal may transmit the subtitle obtaining request to the server through an http request. After receiving the http request, the server parses language indication information and a service identifier included in the request.

In Step S406, the server pushes the subtitle data to the user terminal, in a case that the subtitle language indicated by the language indication information is the language corresponding to the subtitle text, and the subtitle generation service indicated by the service identifier is the target service, and the terminal receives the subtitle data.

After obtaining the language indication information and the service identifier carried in the subtitle obtaining request, the server queries, according to the service identifier, subtitle data of various language/language combinations that is generated by the corresponding subtitle generation service, and selects subtitle data corresponding to the language indicated by the language indication information and pushes the subtitle data to the user terminal.

The subtitle obtaining request may include a time identifier, the time identifier being used for indicating time information of requested subtitle data. When pushing the subtitle data to the user terminal, the server may further query whether the subtitle data corresponding to the time information indicated by the time identifier is cached; and push, based on determining that the subtitle data is cached, the cached subtitle data to the user terminal. However, if the server determines that the subtitle data is not found, the server extracts the subtitle data from a subtitle database, caches the extracted subtitle data, and pushes the cached subtitle data to the user terminal.

In an embodiment, the subtitle data may be stored in a subtitle database. When a subtitle pushing service in the server pushes subtitle data that is generated by a subtitle generation service and that is corresponding to a language/language combination to the user terminal, and if the subtitle data corresponding to a piece of time information is pushed for the first time, the subtitle pushing service pulls the subtitle data from the subtitle database and caches the subtitle data locally. When another user terminal requests the same subtitle data later, the subtitle pushing service may directly push the cached subtitle data to the other user terminal without repeating the above process, thereby reducing a number of access to the server by a plurality of terminal devices.

The subtitle data is also cached in the user terminal locally and in a common gateway interface (CGI). When the server pushes the subtitle data to the user terminal through the CGI, the subtitle data is also cached in CGI. After receiving the subtitle data, the user terminal caches the subtitle data locally. When the user needs subtitle data, the user terminal first queries whether the subtitle data needed is cached locally, if the subtitle data is cached, the user terminal directly obtains the subtitle data locally. However, if the subtitle data is not cached locally, the user terminal transmits a subtitle obtaining request to the CGI. After receiving the subtitle obtaining request transmitted by the user terminal, the CGI first queries whether subtitle data corresponding to the subtitle obtaining request is cached locally, if the subtitle data is cached locally, the CGI directly returns the subtitle data to the user terminal, and if the subtitle data is not cached locally, the CGI forwards the subtitle obtaining request to the server. Through the foregoing embodiment, a three-level cache is set in the user terminal, the CGI and the server, and this can effectively reduce a quantity of times for which the user terminal transmits the subtitle obtaining request, a quantity of times for which the CGI forwards the subtitle obtaining request to the server, and a quantity of times for which the subtitle pushing service in the server accesses the subtitle database, thereby supporting massive users in pulling real-time subtitle data. According to the embodiments of the disclosure, unless otherwise indicated, a "server" and "service" may refer to a hardware and/or software module providing a service.

The server determines a next request time according to time information of the subtitle data pushed to the user terminal and transmits request indication information to the user terminal, the request indication information being used for instructing the user terminal to transmit a new subtitle obtaining request in a case that the next request time arrives. Correspondingly, the user terminal receives request indication information transmitted by the server, the request indication information including a next request time and transmits a new subtitle obtaining request to the server in a case that the next request time arrives.

In an embodiment, the subtitle obtaining request transmitted by the user terminal may include a timestamp used for indicating a current playback progress of the terminal. When pushing the subtitle data to the user terminal, the server may calculate, according to a playable duration of the subtitle data and the current playback progress of the user terminal, next time at which the user terminal requests the subtitle data, and notify the user terminal of the next request time so that the user may request the subtitle data when the next request time arrives, thereby further reducing a quantity of times for which the user terminal requests the subtitle data.

In Step S407, the user terminal synchronously displays the subtitle text and pictures in the video stream data according to the time information corresponding to the subtitle text.

In this embodiment, the user terminal may simultaneously pull the audio and video stream data and the subtitle data, and display them to the user after time synchronization.

Specifically, for video stream data, subtitle data including subtitle text and time information may be generated according to audio stream data corresponding to an audio part in the video stream data, then the subtitle data is pushed to a user terminal. The user terminal receives the subtitle data and synchronously displays the subtitle text and pictures in the video stream data according to the time information, thereby implementing accurate synchronization of subtitles and video pictures. Accordingly, there is no need to manually insert the subtitle data, and live broadcast delay can be effectively reduced.

Figure 9:
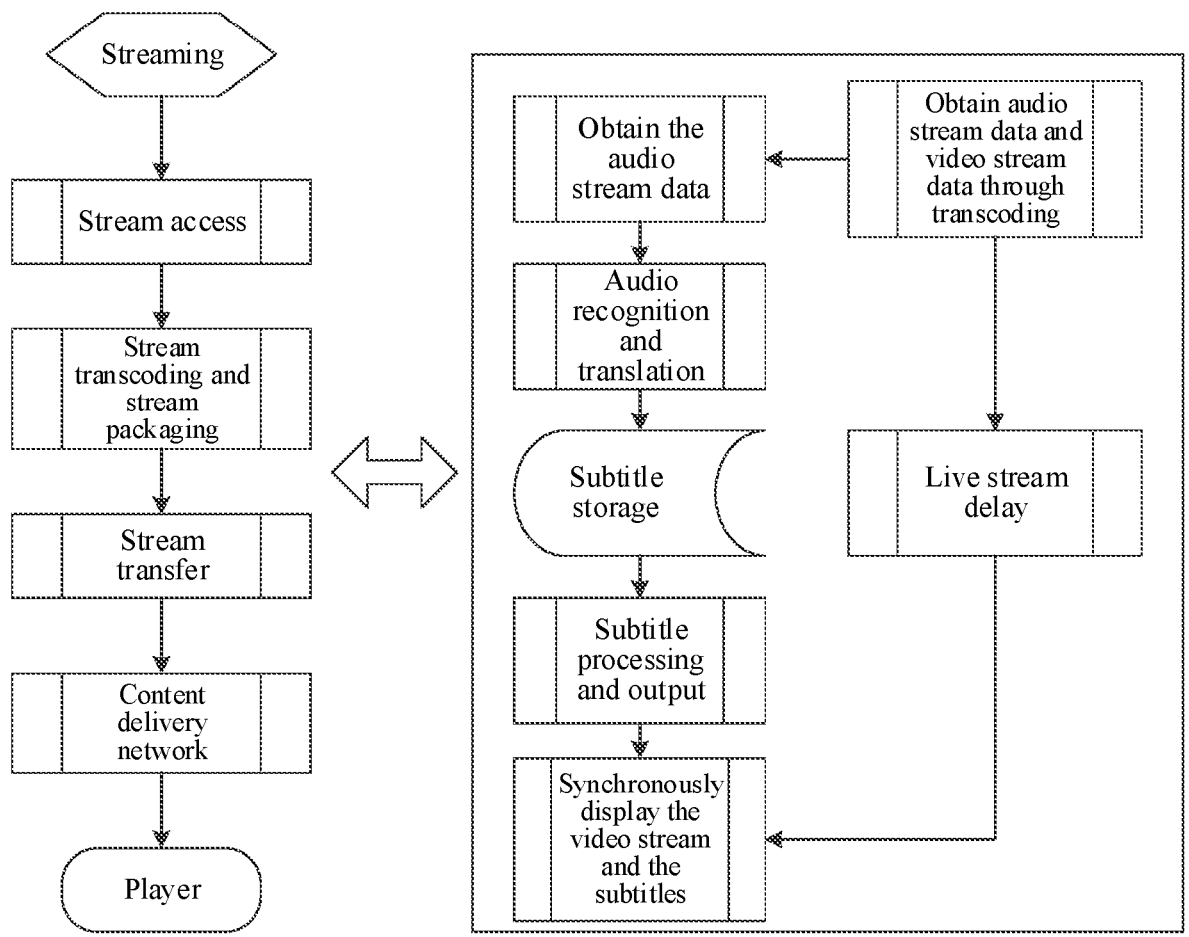
FIG. 9 is a flowchart of subtitle pushing and display in a live scenario according to an embodiment.

For example, the foregoing embodiment may also be applied to a live scenario, and the format of the audio stream data and the video stream data may be an M3U8 file format. FIG. 9 is a flowchart of subtitle pushing and display in a live scenario according to an embodiment. As shown in FIG. 9, the live recording terminal records a live video stream on a scene and pushes the live video stream to the server. The server receives, through a streaming access service, the live video stream pushed by the live recording terminal, transcodes and transpackages the live video stream, and pushes live data (including subtitle data and video stream data) obtained after transcoding and transpackaging to the player on the user terminal side through stream transfer and a content delivery network (CDN) for playback by the player.

In FIG. 9, in a process from the server transcoding and transpackaging the live video stream to the player in the user terminal playing the live stream, the server may obtain audio stream data and video stream data by transcoding the live video stream, and align the audio stream data and the video stream data according to a timestamp (for example, align according to utc time). On the one hand, the server obtains the audio stream data in the M3U8 format, performs speech recognition and translation on the audio stream data to generate and store subtitles, and processes and outputs the subtitles to the user terminal. On the other hand, the server outputs the video stream data to the user terminal after delaying the video stream data, and the player of the user terminal synchronizes and displays the video stream and the subtitles.

Figure 10:
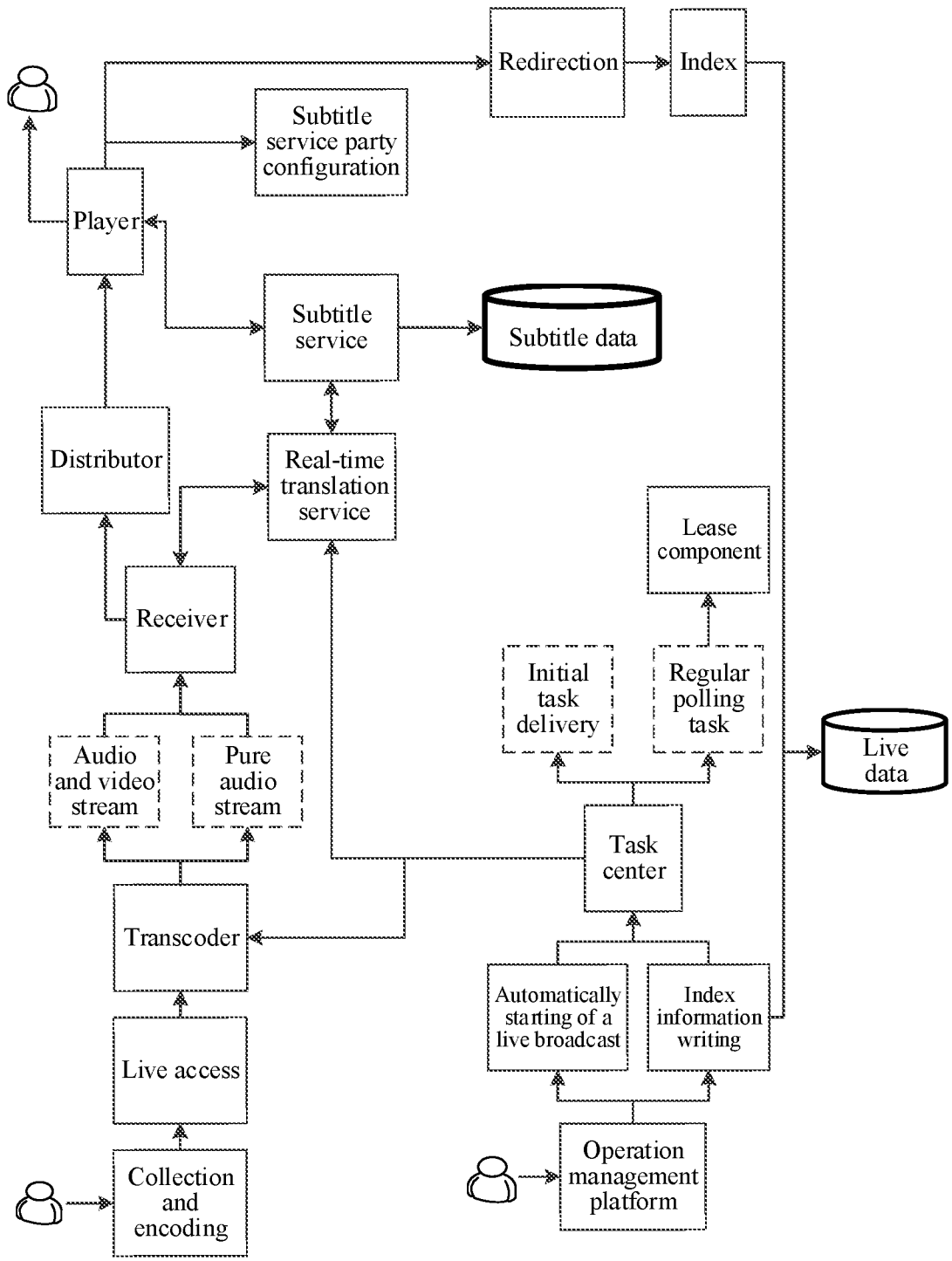
FIG. 10 is an architectural diagram of a subtitle pushing and display system in a live scenario according to an embodiment.

FIG. 10 is an architectural diagram of a subtitle pushing and display system in a live scenario according to an embodiment. For example, this embodiment may be applied to a live scenario. As shown in FIG. 10, the embodiment shown in FIG. 9 may be divided into a video stream access process, a task delivery process, and a subtitle pushing process. A specific implementation process of the three processes may be as follows:

(1) Video Stream Access Process

In the video stream access process, a live video stream obtained through recording and encoding may be connected to a streaming service backend (that is, a server) through streaming.

(2) Task Delivery Process

The task delivery process may include a stream task delivery process and a translation task delivery process. An operator needs to open translation options when configuring a live broadcast through a management platform. In this case, an index information writing service is requested to write basic information of the live broadcast, for example, a live identity, a channel identity (chid), a stream identity (sid), a user account and a live title, and a translation switch (the translation switch being used for indicating whether to add translated subtitles to a live task) into storage. At the same time, a service for automatically starting a live broadcast is requested for starting a live broadcast. When live time arrives, the service delivers a task to a task center. The task center performs an initial task delivery task and a regular polling task to prevent the task from being interrupted and restarted. To prevent a single point of failure, in this embodiment, a zookeeper-based lease service is added to perform disaster recovery on the regular polling task. The task center delivers a task to a stream transcoding service (hlsconveter) to output an audio and video stream and a standard pure audio stream for a real-time translation server to pull and process. At the same time, the task center further delivers a task to the real-time translation server to pull an M3U8 audio stream. The M3U8 audio stream is provided through a stream transfer service (hlsreceiver) pulling the stream transcoding service. The data obtained after the translation server performs recognition and translation is pushed to a subtitle server in time.

Figure 11:
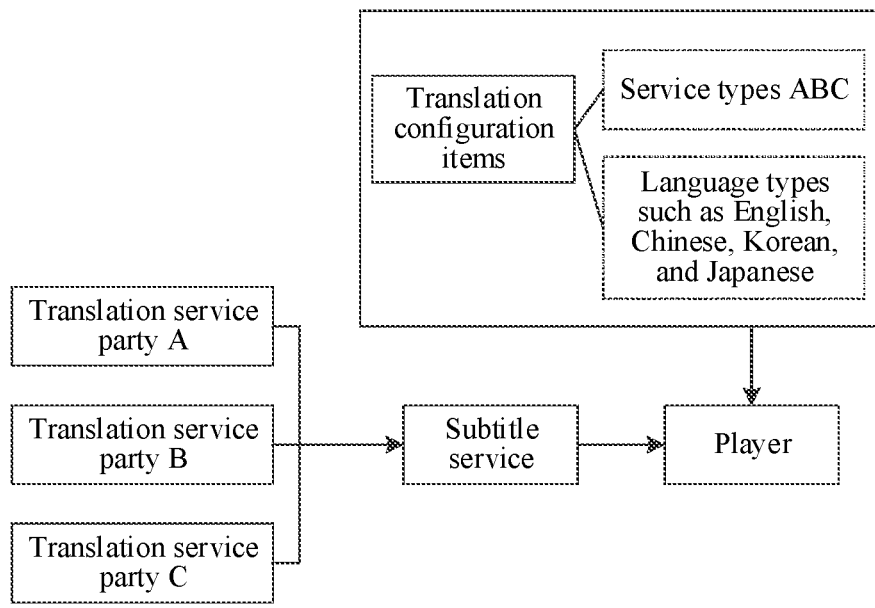
FIG. 11 is a schematic diagram of a service access according to an embodiment.

FIG. 11 is a schematic diagram of service access according to an embodiment. In this embodiment, the translation server supports that a translation service party (corresponding to the foregoing subtitle generation service) is written into a configuration table through registration, and may simultaneously support a plurality of translation service parties (for example, XX simultaneous interpretation, XX LAB, and the like). Each translation service party may provide a plurality of language translation (for example, English, Chinese, French, Japanese, and the like), and the user may choose a favorite translation service party and a language/language combination to watch subtitles.

(3) Subtitle Pushing Process

The subtitle pushing process may be a process of playing and pulling subtitles by the user. When opening a player to watch a live broadcast, the audience pulls subtitle service parties and language type configuration, and requests redirection to obtain a live address, a translation switch, and a quantity of hls rollback frames. The player retrieves stream data according to a playback address through an hls protocol, and performs rollback according to the quantity of hls rollback frames in the hlsreceiver. Rollback logic is placed on an upper layer retrieval server to ensure that playback experience of the user is not affected (if the rollback logic is placed on an hlsdistributor, the user will wait for corresponding fallback frames before playback). The player, through an http protocol according to a service party and a language that are selected by the user, requests the subtitle server to obtain subtitle data.

Figure 12:
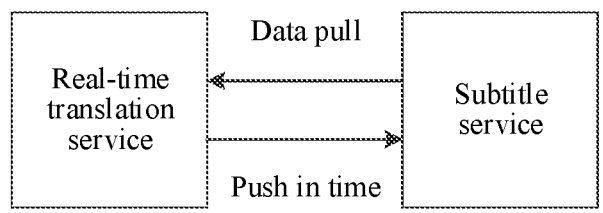
FIG. 12 is a schematic diagram of a subtitle data synchronization according to an embodiment.

FIG. 12 is a schematic diagram of subtitle data synchronization according to an embodiment. As shown in FIG. 12, to prevent a failure in a subtitle pushing process, a subtitle server will periodically synchronize the subtitle data to the real-time translation server according to sequence numbers of subtitle data blocks in the received subtitle data.

Figure 13:
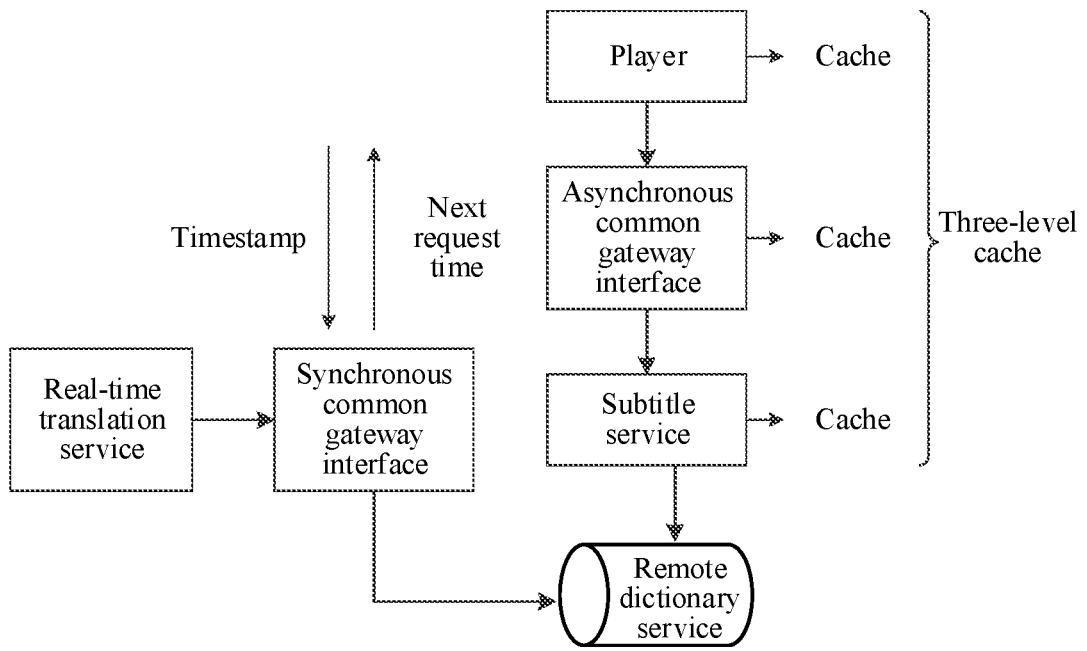
FIG. 13 is a schematic diagram of three-level cache according to an embodiment.

The embodiment may also support massive users in pulling real-time translation data. For example, FIG. 13 is a schematic diagram of a three-level cache according to an embodiment. As shown in FIG. 13, the real-time translation service writes, through a synchronous CGI, subtitle data into a zsort structure of a remote dictionary server (REmote Dictionary Server, Redis) sorted by timestamps. The player uses a timestamp to request the subtitle data, and the three-level cache in the player, an asynchronous CGI, and the subtitle service may be used to reduce a quantity of requests. At the same time, the request transmitted by the player carries a timestamp, and the server notifies the player of a next request time according to the amount of data returned.

The video stream may be a video stream based on an hls protocol, or may be a video stream based on a streaming media protocol in another format such as a real time messaging protocol (rtmp)/real time streaming protocol (rtsp). However, the format of the video stream is not limited in this embodiment.

In addition, the subtitle data may be transmitted through an http protocol, or may be transmitted through an M3U8 file, that is, the subtitle data may be carried in the M3U8 file to be transmitted to the user terminal, and the user terminal parses the M3U8 file to obtain the subtitle data. The M3U8 file may be recognized by the player and no additional http signaling support is required.

Figure 14:
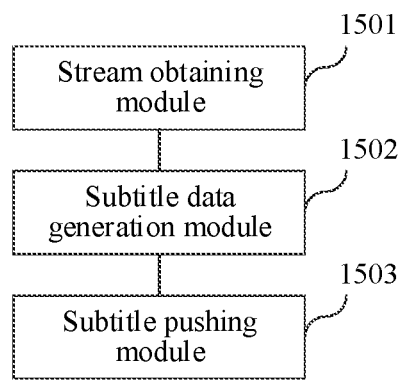
FIG. 14 is a structural block diagram of an apparatus for pushing subtitle data according to an embodiment.

FIG. 14 is a structural block diagram of an apparatus for pushing subtitle data according to an example embodiment. The apparatus for pushing subtitle data may be used in the system shown in FIG. 1 to perform all or some of the steps performed by the server in the method provided in the embodiment with reference to FIG. 2 and FIG. 3.

The apparatus for pushing subtitle data may include a stream obtaining module 1501 configured to obtain video stream data and audio stream data, the audio stream data being data corresponding to an audio part in the video stream data; a subtitle data generation module 1502 configured to generate the subtitle data according to the audio stream data, the subtitle data including subtitle text corresponding to speech in the audio stream data, and time information corresponding to the subtitle text; and a subtitle pushing module 1503 configured to push, in response to pushing the video stream data to a user terminal, the subtitle data to the user terminal, the subtitle data being used for instructing the user terminal to synchronously display the subtitle text and live pictures in the video stream data according to the time information corresponding to the subtitle text.

The subtitle pushing module 1503 may be further configured to receive a subtitle obtaining request transmitted by the user terminal, the subtitle obtaining request carrying language indication information, and the language indication information being used for indicating a subtitle language; and push the subtitle data to the user terminal, in a case that the subtitle language indicated by the language indication information is a language corresponding to the subtitle text.

When generating the subtitle data according to the audio stream data, the subtitle data generation module 1502 is specifically configured to generate the subtitle data according to the audio stream data through a target service, the target service being any one of at least one subtitle generation service, where the subtitle obtaining request further includes a service identifier, and the service identifier is used for indicating a subtitle generation service. When pushing the subtitle data to the user terminal, the subtitle pushing module 1503 is specifically configured to push the subtitle data to the user terminal, in a case that the subtitle language indicated by the language indication information is the language corresponding to the subtitle text, and the subtitle generation service indicated by the service identifier is the target service.

The subtitle obtaining request may further include a time identifier, in which the time identifier is used for indicating time information of requested subtitle data; and when pushing the subtitle data to the user terminal, the subtitle pushing module 1503 is specifically configured to query whether the subtitle data corresponding to the time information indicated by the time identifier is cached; and push, in a case that it is found that the subtitle data is cached, the cached subtitle data to the user terminal.

The apparatus may further include a subtitle extraction module configured to extract, in a case that the subtitle data is not found, the subtitle data from a subtitle database; and a cache module configured to cache the extracted subtitle data.

The apparatus may further include a time determining module configured to determine a next request time according to time information of the subtitle data pushed to the user terminal; and an indication information transmitting module configured to transmit request indication information to the user terminal, the request indication information being used for instructing the user terminal to transmit a new subtitle obtaining request in a case that the next request time arrives.

The apparatus may further include a sequence number detection module configured to detect whether sequence numbers of data blocks in the subtitle data are consecutive; a data block request module configured to request, in a case that the sequence numbers of the data blocks in the subtitle data are not consecutive, data blocks corresponding to missing sequence numbers from the target service, the missing sequence numbers being sequence numbers that are missing between a sequence number of the first data block and a sequence number of the last data block in the subtitle data; and a data completion module configured to complete the subtitle data through the data blocks corresponding to the missing sequence numbers.

The subtitle data generation module 1502 may be specifically configured to perform speech recognition on the audio stream data, to obtain speech recognized text; and generate the subtitle data according to the speech recognized text.

When performing speech recognition on the audio stream data to obtain speech recognized text, the subtitle data generation module 1502 may be specifically configured to perform speech start and end detection on the audio stream data to obtain a speech start frame and a speech end frame in the audio stream data, the speech start frame being an audio frame at the start of a speech segment, and the speech end frame being an audio frame at the end of the speech segment; and perform speech recognition on target speech data in the audio stream data to obtain recognized text corresponding to the target speech data, the target speech data including audio frames between any set of the speech start frame and the speech end frame in the audio stream data.

When performing speech recognition on target speech data in the audio stream data to obtain recognized text corresponding to the target speech data, the subtitle data generation module 1502 may be specifically configured to perform speech frame extraction at predetermined time intervals according to time information corresponding to the audio frames in the target speech data, to obtain at least one piece of speech subdata, the speech subdata including audio frames between the speech start frame and a target audio frame in the target speech data, and the target audio frame being an audio frame in a case that the speech frame extraction operation of the speech subdata corresponds to the time information in the target speech data; perform speech recognition on the at least one piece of speech subdata, to obtain recognized subtext corresponding to the at least one piece of speech subdata respectively; and obtain the recognized subtext corresponding to the at least one piece of speech subdata respectively as recognized text corresponding to the target speech data.

When generating the subtitle data according to the speech recognized text, the subtitle data generation module 1502 may be specifically configured to translate the speech recognized text into translated text corresponding to a target language; generate the subtitle text according to the translated text, the subtitle text including the translated text, or, the subtitle text including the speech recognized text and the translated text; and generate the subtitle data according to the subtitle text.

The stream obtaining module 1501 may be specifically configured to transcode a video stream through the same transcoding process in the same transcoding device to obtain the video stream data and the audio stream data with synchronized time information.

The video stream data may be live video stream data.

According to the embodiments of the disclosure, for video stream data, subtitle data including subtitle text and time information may be generated according to audio stream data corresponding to an audio part in the video stream data, then the subtitle data is pushed to a user terminal, and the user terminal synchronously displays the subtitle text and live pictures in the video stream data according to the time information, thereby implementing accurate synchronization of subtitles and video pictures. Accordingly, there is no need to manually insert the subtitle data, and live broadcast delay can be effectively reduced.

Figure 15:
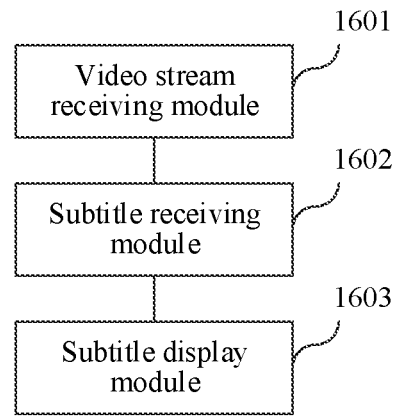
FIG. 15 is a structural block diagram of a subtitle display apparatus according to an embodiment.

FIG. 15 is a structural block diagram of a subtitle display apparatus according to an example embodiment. The subtitle display apparatus may be used in the system shown in FIG. 1 to perform all or some of the steps performed by the user terminal in the method provided in the embodiment with reference to FIG. 2 and FIG. 3. The subtitle display apparatus may include a video stream receiving module 1601 configured to receive video stream data pushed by a server; a subtitle receiving module 1602 configured to receive subtitle data pushed by the server, the subtitle data being data generated by the server according to audio stream data included in the video stream data, the subtitle data including subtitle text corresponding to speech in the audio stream data, and time information corresponding to the subtitle text, and the audio stream data being data corresponding to an audio part in the video stream data; and a subtitle display module 1603 configured to synchronously display the subtitle text and live pictures in the video stream data according to the time information corresponding to the subtitle text.

The subtitle receiving module 1602 may specifically configured to transmit a subtitle obtaining request to the server, the subtitle obtaining request including language indication information, and the language indication information being used for indicating a subtitle language; and receive the subtitle data pushed by the server in a case that the subtitle language indicated by the language indication information is a language corresponding to the subtitle text.

The subtitle obtaining request may further include a service identifier, where the service identifier is used for indicating a subtitle generation service. The subtitle receiving module 1602 is specifically configured to receive the subtitle data pushed by the server in a case that the subtitle language indicated by the language indication information is the language corresponding to the subtitle text, and the subtitle generation service indicated by the service identifier is a target service, the target service being a subtitle generation service that generates the subtitle data.

The apparatus may further include an interface display module configured to, before the subtitle receiving module 1602 transmits the subtitle obtaining request to the server, display a subtitle selection interface, the subtitle selection interface including at least one subtitle option, and each subtitle option corresponding to a combination of a subtitle language and a subtitle generation service; and a request generation module configured to generate, in a case that a selection operation in the subtitle selection interface is received, the subtitle obtaining request according to a subtitle option corresponding to the selection operation.

The apparatus may further include a request indication receiving module configured to receive request indication information transmitted by the server, the request indication information including a next request time; and a request transmitting module configured to transmit a new subtitle obtaining request to the server, in a case that the next request time arrives.

Figure 16:
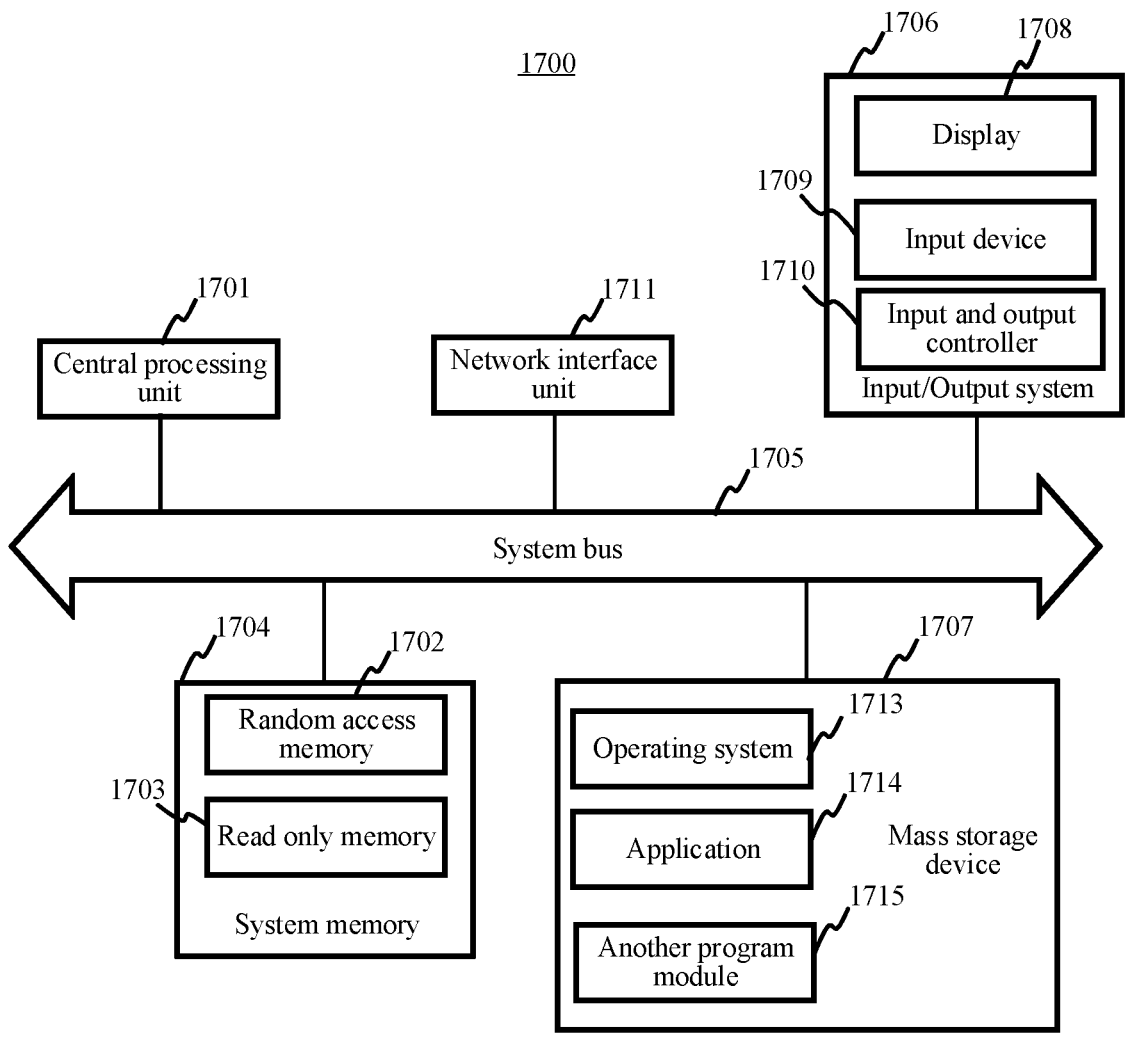
FIG. 16 is a structural block diagram of a computer device according to an embodiment.

FIG. 16 is a structural block diagram of a computer device 1700 according to an example embodiment. The computer device 1700 may be the server described in the foregoing embodiments. The computer device 1700 may include a central processing unit (CPU) 1701, a system memory 1704 including a random access memory (RAM) 1702 and a read only memory (ROM) 1703, and a system bus 1705 connecting the system memory 1704 and the central processing unit 1701. The computer device 1700 further includes a basic input/output system (I/O system) 1706 configured to transmit information between components in a computer, and a mass storage device 1707 configured to store an operating system 1713, an application program 1714, and another program module 1715.

The basic input/output system 1706 includes a display 1708 configured to display information and an input device 1709, such as a mouse or a keyboard, that is configured for inputting information by a user. The display 1708 and the input device 1709 are both connected to the central processing unit 1701 by using an input and output controller 1710 connected to the system bus 1705. The basic input/output system 1706 may further include the input and output controller 1710 for receiving and processing an input from a plurality of other devices such as a keyboard, a mouse, or an electronic stylus. Similarly, the input/output controller 1710 further provides an output to a display, a printer, or another type of output device.

The mass storage device 1707 is connected to the central processing unit 1701 by using a mass storage controller connected to the system bus 1705. The mass storage device 1707 and an associated computer-readable medium provide non-volatile storage for the computer device 1700. That is, the large-capacity storage device 1707 may include a computer-readable medium, such as a hard disk drive or a CD-ROM driver.

In general, the computer-readable medium may include a computer storage medium and a communications medium. The computer storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Here, it may be understood by a person skilled in the art that the computer storage medium is not limited to the foregoing types. In addition, the system memory 1704 and the mass storage device 1707 may be collectively referred to as a memory.

The computer device 1700 may be connected to the Internet or another network device by using a network interface unit 1711 connected to the system bus 1705.

The memory further includes one or more than one programs. The one or more programs are stored in the memory. The CPU 1701 executes the one or more programs to implement all or some steps performed by the server according to the embodiments shown in FIG. 2 and FIG. 3.

Figure 17:
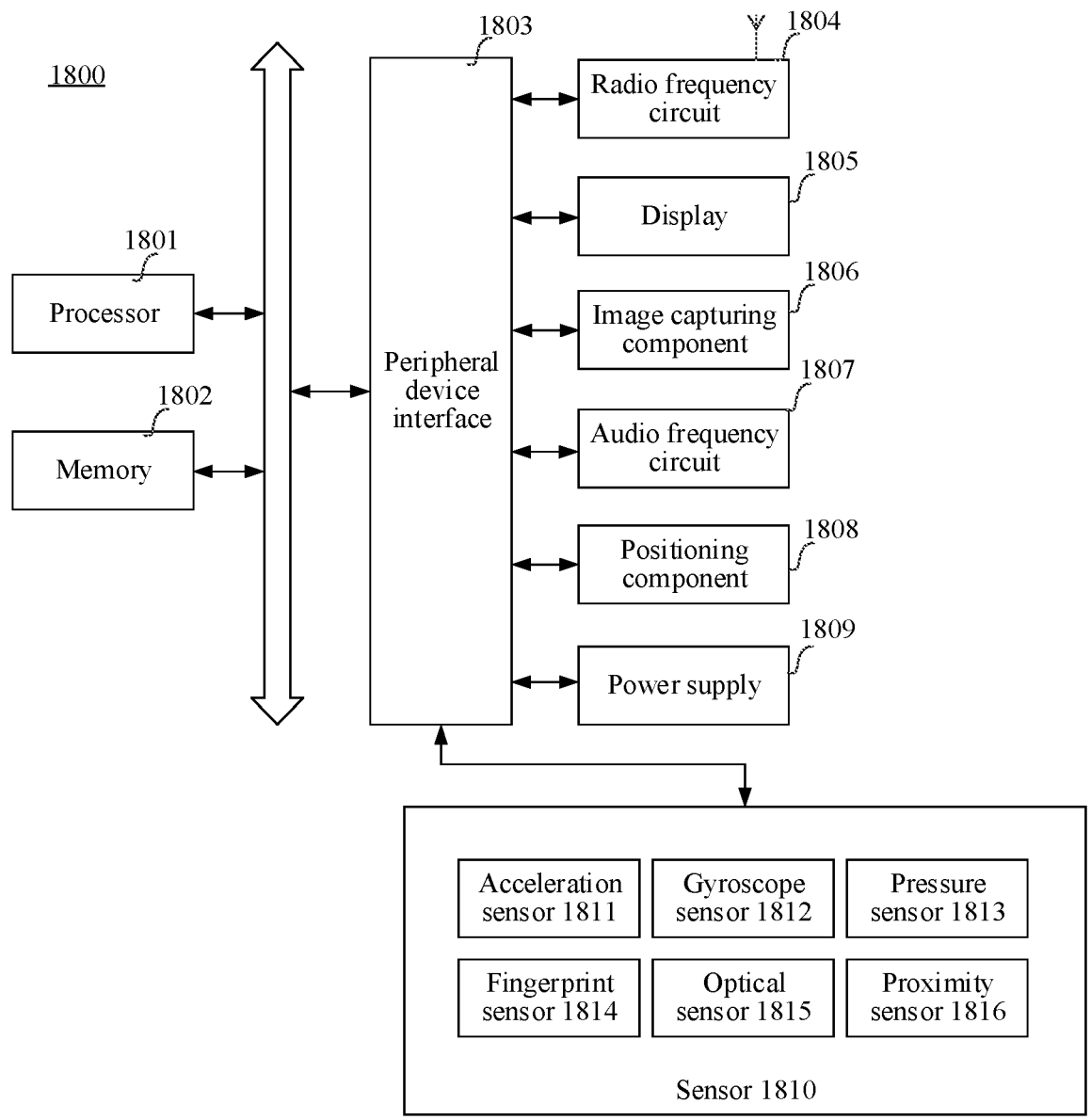
FIG. 17 is a structural block diagram of a user terminal according to an embodiment.

FIG. 17 is a structural block diagram of a user terminal 1800 according to an example embodiment. The user terminal 1800 may be a smartphone, a tablet computer, an e-book reader, smart glasses, a smart watch, a Moving Picture Experts Group Audio Layer III (MP3) player, a Moving Picture Experts Group Audio Layer IV (MP4) player, a notebook computer, or a desktop computer. The user terminal 1800 may also be referred to as another name such as user equipment, a portable user terminal, a laptop user terminal, or a desktop user terminal.

Generally, the user terminal 1800 includes a processor 1801 and a memory 1802.

The processor 1801 includes one or more processing cores, for example, a 4-core processor or an 8-core processor. The processor 1801 may be implemented by at least one hardware form of a digital signal processor (DSP), a field-programmable gate array (FPGA), and a programmable logic array (PLA). The processor 1801 may alternatively include a main processor and a coprocessor. The main processor is configured to process data in an awake state, also referred to as a central processing unit (CPU), and the coprocessor is a low-power processor configured to process data in an idle state. In some embodiments, the processor 1801 may be integrated with a graphics processing unit (GPU). The GPU is responsible for rendering and drawing content to be displayed by a display. In some embodiments, the processor 1801 may further include an artificial intelligence (AI) processor. The AI processor is configured to process a calculation operation related to machine learning.

The memory 1802 may include one or more computer-readable storage media. The computer-readable storage media may be non-transient. The memory 1802 may further include a high-speed random access memory, and a non-volatile memory such as one or more magnetic disk storage devices and a flash memory device. In some embodiments, the non-transient computer-readable storage medium in the memory 1802 is configured to store at least one instruction. The at least one instruction is executed by the processor 1801 to implement the method performed by the user terminal in the methods provided in the foregoing method embodiments.

In some embodiments, the user terminal 1800 may further include a peripheral device interface 1803 and at least one peripheral device. The processor 1801, the memory 1802, and the peripheral device interface 1803 may be connected through a bus or a signal cable. Each peripheral device may be connected to the peripheral device interface 1803 through a bus, a signal cable, or a circuit board. Specifically, the peripheral device includes at least one of a radio frequency (RF) circuit 1804, a touch display 1805, an image capturing component 1806, an audio frequency circuit 1807, a positioning component 1808, and a power supply 1809.

The peripheral device interface 1803 may be configured to connect at least one peripheral device related to input/output (I/O) to the processor 1801 and the memory 1802. In some embodiments, the processor 1801, the memory 1802, and the peripheral device interface 1803 are integrated into the same chip or circuit board. In some other embodiments, any one or two of the processor 1801, the memory 1802, and the peripheral device interface 1803 may be implemented on an independent chip or circuit board, and the implementation is not limited in this embodiment.

In some embodiments, the user terminal 1800 further includes one or more sensors 1810. The one or more sensors 1810 include, but are not limited to, an acceleration sensor 1811, a gyroscope sensor 1812, a pressure sensor 1813, a fingerprint sensor 1814, an optical sensor 1815, and a proximity sensor 1816.

The structure shown in FIG. 17 does not constitute a limitation to the user terminal 1800, and the terminal may include more components or fewer components than those shown in the FIG. 17, or some components may be combined, or a different component deployment may be used.

According to an embodiment, a non-transitory computer-readable storage medium including an instruction, for example, a memory including a computer program (an instruction or set of instructions), is further provided, and the computer program may be executed by a processor of a computer device to perform the method performed by the server or the user terminal as described in the above embodiments. For example, the non-transitory computer-readable storage medium may be a ROM, a random access memory (RAM), a CD-ROM, a magnetic tape, a floppy disk, an optical data storage device, or the like.

A person skilled in the art would easily conceive of other implementations of the embodiments of the disclosure. The disclosure is intended to cover any variation, use, or adaptive changes to the embodiments of this disclosure. These variations, uses, or adaptive changes may follow the general principles of this disclosure and include common general knowledge or common technical means in the art that are not described in the disclosure.

It is to be understood that the embodiments of the disclosure are not limited to the specific embodiments described above and shown in the accompanying drawings, and various modifications and changes can be made without departing from the scope of the disclosure.

What is claimed is:

1. A method for pushing subtitle data, performed by a computer device, the method comprising:
   obtaining video stream data and audio stream data, the audio stream data being data corresponding to an audio part in the video stream data;
   generating the subtitle data according to the audio stream data, the subtitle data comprising a subtitle text corresponding to a speech in the audio stream data and time information of the subtitle text;
   pushing, in response to pushing the video stream data to a user terminal, the subtitle data to the user terminal, the subtitle data instructing the user terminal to synchronously display the subtitle text with live pictures in the video stream data and the audio part in the audio stream data according to the time information of the subtitle text; and
   receiving a subtitle obtaining request from the user terminal, the subtitle obtaining request comprises a time identifier, the time identifier indicating time information of the requested subtitle data,
   wherein the generating the subtitle data according to the audio stream data comprises generating the subtitle data according to the audio stream data through a target service, the target service including a subtitle generation service,
   wherein the subtitle obtaining request further includes a service identifier used for indicating a subtitle generation service,
   wherein the pushing the subtitle data to the user terminal further comprises pushing the subtitle data to the user terminal based on determining that the subtitle generation service indicated by the service identifier is the target service, and
   wherein the method further comprises:
   detecting whether sequence numbers of data blocks in the subtitle data are consecutive;
   based on determining that the sequence numbers of the data blocks in the subtitle data are not consecutive, requesting data blocks corresponding to missing sequence numbers from the target service, the missing sequence numbers being sequence numbers that are missing between a sequence number of the first data block and a sequence number of the last data block in the subtitle data, receiving the data blocks corresponding to the missing sequence numbers from the target service; and
   rearranging the subtitle data based on the received data blocks corresponding to the missing sequence numbers wherein the pushing the subtitle data to the user terminal further comprises:
   querying whether the subtitle data corresponding to the time information indicated by the time identifier is cached;
   based on determining that the subtitle data corresponding to the time information is cached, pushing the cached subtitle data to the user terminal; and
   delaying the pushing of the video stream data to the user terminal to synchronize the subtitle text with the video stream data.

2. The method according to claim 1, wherein the subtitle obtaining request further comprises language indication information indicating a subtitle language of the subtitle data, and wherein the pushing, in response to the pushing the video stream data to the user terminal, the subtitle data to the user terminal comprises:
determining whether the subtitle language indicated by the language indication information is a language corresponding to the subtitle text; and
based on determining that the language indication information is the language corresponding to the subtitle text, pushing the subtitle data to the user terminal.

3. The method according to claim 1, further comprising:
based on determining that the subtitle data is not found, extracting the subtitle data from a subtitle database; and
caching the extracted subtitle data.

4. The method according to claim 2, further comprising:
determining a next request time according to the time information of the subtitle data pushed to the user terminal; and
transmitting request indication information to the user terminal, the request indication information instructing the user terminal to transmit a new subtitle obtaining request when the next request time arrives.

5. The method according to claim 1, wherein the generating the subtitle data according to the audio stream data comprises:
performing a speech recognition on the audio stream data to obtain a speech recognized text; and
generating the subtitle data according to the speech recognized text.

6. The method according to claim 5, wherein the performing speech recognition on the audio stream data to obtain the speech recognized text comprises:
performing a speech start and end detection on the audio stream data to obtain a speech start frame and a speech end frame in the audio stream data, the speech start frame being an audio frame at the start of a speech segment and the speech end frame being an audio frame at the end of the speech segment; and
performing the speech recognition on target speech data in the audio stream data to obtain the speech recognized text corresponding to the target speech data, the target speech data comprising a plurality of audio frames between any set of the speech start frame and the speech end frame in the audio stream data.

7. The method according to claim 6, wherein the performing the speech recognition on the target speech data in the audio stream data further comprises:
performing a speech frame extraction at predetermined time intervals according to the time information of the plurality of audio frames in the target speech data to obtain at least one piece of speech subdata, the speech subdata comprising at least one audio frame, among the plurality of audio frames, between the speech start frame and a target audio frame in the target speech data when the speech frame extraction operation of the speech subdata corresponds to the time information in the target speech data;
performing the speech recognition on the at least one piece of speech subdata to obtain recognized subtext corresponding to the at least one piece of speech subdata; and
obtaining the recognized subtext corresponding to the at least one piece of speech subdata as the speech recognized text corresponding to the target speech data.

8. The method according to claim 5, wherein the generating the subtitle data according to the speech recognized text comprises:

translating the speech recognized text into translated text corresponding to a target language;
generating the subtitle text according to the translated text, the subtitle text comprising at least one of the translated text or the speech recognized text; and
generating the subtitle data according to the subtitle text.

9. The method according to claim 1, wherein the obtaining the video stream data and the audio stream data comprises:
transcoding a video stream through a transcoding process in a transcoding device to obtain the video stream data and the audio stream data with synchronized time information.

10. The method according to claim 1, wherein the video stream data is live video stream data.

11. An apparatus for pushing subtitle data, comprising:
at least one memory storing compute program code; and
at least one processor configured to access the at least one memory and operate as instructed by the computer program code, the computer program code comprising:
stream obtaining code configured to cause the at least one processor to obtain video stream data and audio stream data, the audio stream data being data corresponding to an audio part in the video stream data;
subtitle data generation code configured to cause the at least one processor to generate the subtitle data according to the audio stream data, the subtitle data comprising a subtitle text corresponding to a speech in the audio stream data and time information of the subtitle text; and
subtitle pushing code configured to cause the at least one processor to:
push, in response to pushing the video stream data to a user terminal, the subtitle data to the user terminal, the subtitle data instructing the user terminal to synchronously display the subtitle text with live pictures in the video stream data and the audio part in the audio stream data according to the time information of the subtitle text;
receive a subtitle obtaining request from the user terminal, the subtitle obtaining request comprising a time identifier, the time identifier indicating time information of the requested subtitle data;
query whether the subtitle data corresponding to the time information indicated by the time identifier is cached;
based on determining that the subtitle data corresponding to the time information is cached, push the cached subtitle data to the user terminal; and
delay the pushing of the video stream data to the user terminal to synchronize the subtitle text with the video stream data,
wherein the subtitle data generation code is further configured to cause the at least one processor to generate the subtitle data according to the audio stream data through a target service, the target service including a subtitle generation service,
wherein the subtitle obtaining request further includes a service identifier used for indicating a subtitle generation service,
wherein the subtitle pushing code is further configured to cause the at least one processor to push the subtitle data to the user terminal based on determining that the subtitle generation service indicated by the service identifier is the target service, and wherein the apparatus further comprises sequence number detection code configured to cause the at least one processor to:
detect whether sequence numbers of data blocks in the subtitle data are consecutive, based on determining that the sequence numbers of the data blocks in the subtitle data are not consecutive, request data blocks corresponding to missing sequence numbers from the target service, the missing sequence numbers being sequence numbers that are missing between a sequence number of the first data block and a sequence number of the last data block in the subtitle data;

receive the data blocks corresponding to the missing sequence numbers from the target service; and rearrange the subtitle data based on the received data blocks corresponding to the missing sequence numbers.

12. The apparatus according to claim 11, wherein the subtitle obtaining request further comprises language indication information indicating a subtitle language of the subtitle data, and wherein the subtitle pushing code is further configured to cause the at least one processor to:

determine whether the subtitle language indicated by the language indication information is a language corresponding to the subtitle text; and based on determining that the language indication information is the language corresponding to the subtitle text, push the subtitle data to the user terminal.

13. The apparatus according to claim 12, further comprising:

time determining code configured to cause the at least one processor to determine a next request time according to the time information of the subtitle data pushed to the user terminal; and indication information transmitting code configured to cause the at least one processor to transmit request indication information to the user terminal, the request indication information instructing the user terminal to transmit a new subtitle obtaining request when the next request time arrives.

14. The apparatus according to claim 11, wherein the subtitle data generation code is further configured to cause the at least one processor to:

perform a speech recognition on the audio stream data to obtain a speech recognized text; and generate the subtitle data according to the speech recognized text.

15. A non-transitory computer-readable storage medium, storing at least one instruction, the at least one instruction, when loaded and executed by a processor, the processor is configured to:

obtain video stream data and audio stream data, the audio stream data being data corresponding to an audio part in the video stream data;

generate the subtitle data according to the audio stream data, the subtitle data comprising a subtitle text corresponding to a speech in the audio stream data and time information of the subtitle text; and push, in response to pushing the video stream data to a user terminal, the subtitle data to the user terminal, the subtitle data instructing the user terminal to synchronously display the subtitle text with live pictures in the video stream data and the audio part in the audio stream data according to the time information of the subtitle text; and receive a subtitle obtaining request from the user terminal, the subtitle obtaining request comprising a time identifier, the time identifier indicating time information of the requested subtitle data, wherein the subtitle obtaining request further includes a service identifier used for indicating a subtitle generation service, and wherein the processor is further configured to:

generate the subtitle data according to the audio stream data through a target service, the target service including a subtitle generation service, push the subtitle data to the user terminal based on determining that the subtitle generation service indicated by the service identifier is the target service, and detect whether sequence numbers of data blocks in the subtitle data are consecutive;

based on determining that the sequence numbers of the data blocks in the subtitle data are not consecutive, request data blocks corresponding to missing sequence numbers from the target service, the missing sequence numbers being sequence numbers that are missing between a sequence number of the first data block and a sequence number of the last data block in the subtitle data:

receive the data blocks corresponding to the missing sequence numbers from the target service; and rearrange the subtitle data based on the received data blocks corresponding to the missing sequence numbers receive a subtitle obtaining request from the user terminal, the subtitle obtaining request comprising a time identifier, the time identifier indicating time information of the requested subtitle data, and query whether the subtitle data corresponding to the time information indicated by the time identifier is cached;

based on determining that the subtitle data corresponding to the time information is cached, push the cached subtitle data to the user terminal; and delay the pushing of the video stream data to the user terminal to synchronize the subtitle text with the video stream data.

\* \* \* \* \*